US010406729B2

(12) United States Patent
Gaw et al.

(10) Patent No.: US 10,406,729 B2
(45) Date of Patent: Sep. 10, 2019

(54) COMPRESSION MOLDING ASSEMBLY AND METHODS FOR MOLDING A THERMOPLASTIC BLOCKER DOOR

(71) Applicant: THE BOEING COMPANY, Chicago, IL (US)

(72) Inventors: Kevin O'Brien Gaw, Seattle, WA (US); Michael A. Nill, Seattle, WA (US); Garry Anthony Booker, Lake Stevens, WA (US); Stephen R. Dark, Lynnwood, WA (US); Laura Fournier, Mill Creek, WA (US); Randy J. Grove, Seattle, WA (US); David John Barene, Arlington, WA (US); Jeston Lingelbach, Kenmore, WA (US); Kory Shaffer, Bothell, WA (US); David W. Foutch, Seattle, WA (US); Michael H. Larson, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 124 days.

(21) Appl. No.: 15/250,297

(22) Filed: Aug. 29, 2016

(65) Prior Publication Data
US 2018/0056554 A1 Mar. 1, 2018

(51) Int. Cl.
*B29C 43/36* (2006.01)
*B29C 43/18* (2006.01)
(Continued)

(52) U.S. Cl.
CPC .......... *B29C 43/36* (2013.01); *B29C 33/0033* (2013.01); *B29C 33/30* (2013.01);
(Continued)

(58) Field of Classification Search
CPC ......... B29C 33/52; B29C 45/40; B29C 41/42; B29C 2043/3665
See application file for complete search history.

(56) References Cited

U.S. PATENT DOCUMENTS

| | | |
|---|---|---|
| 1,427,149 A | 8/1922 | Cook |
| 3,864,196 A | 2/1975 | Schmidt |

(Continued)

FOREIGN PATENT DOCUMENTS

| | | |
|---|---|---|
| DE | 51287 C | 8/1889 |
| EP | 3128163 A1 | 2/2018 |

(Continued)

OTHER PUBLICATIONS

European Examination Report dated Oct. 2, 2018 regarding European Patent Application No. 17 188 299.6-1014, pp. 1-3.
(Continued)

*Primary Examiner* — Joseph S Del Sole
*Assistant Examiner* — Thu Khanh T Nguyen
(74) *Attorney, Agent, or Firm* — Armstrong Teasdale LLP

(57) ABSTRACT

A compression molding assembly for molding a honeycomb core, including a plurality of cells defined by a plurality of walls, of a blocker door is provided. The compression molding assembly includes a ram plate comprising a plurality of openings defined therethrough and a plurality of core inserts coupled to the ram plate such that the plurality of core inserts are configured to form the honeycomb core of the blocker door. Each core insert is removably coupled with a respective opening of the plurality of openings such that each core insert is configured to form a respective cell of the plurality of cells.

16 Claims, 20 Drawing Sheets

(51) Int. Cl.
- *B29C 43/50* (2006.01)
- *B29C 33/00* (2006.01)
- *B29C 33/30* (2006.01)
- *B29D 99/00* (2010.01)
- *F02K 1/00* (2006.01)
- *F02K 1/72* (2006.01)
- *B29K 101/12* (2006.01)
- *B29L 31/00* (2006.01)
- *B29C 33/44* (2006.01)
- *B29L 31/60* (2006.01)
- *B64D 29/00* (2006.01)

(52) U.S. Cl.
CPC ............ *B29C 33/302* (2013.01); *B29C 43/18* (2013.01); *B29C 43/50* (2013.01); *B29D 99/0089* (2013.01); *F02K 1/00* (2013.01); *F02K 1/72* (2013.01); *B29C 33/444* (2013.01); *B29C 2043/366* (2013.01); *B29C 2043/3665* (2013.01); *B29C 2043/503* (2013.01); *B29K 2101/12* (2013.01); *B29L 2031/608* (2013.01); *B29L 2031/724* (2013.01); *B29L 2031/7504* (2013.01); *B64D 29/00* (2013.01); *F05D 2230/20* (2013.01); *F05D 2230/50* (2013.01); *F05D 2300/603* (2013.01)

(56) References Cited

U.S. PATENT DOCUMENTS

| | | |
|---|---|---|
| 5,152,860 A | 10/1992 | Grossmann et al. |
| 5,315,820 A | 5/1994 | Arnold |
| 5,802,696 A | 9/1998 | Zuccarini |
| 8,567,467 B2 | 10/2013 | Maheshwari et al. |
| 2012/0205836 A1* | 8/2012 | Chen .................. B29C 33/302 |
| | | 425/470 |
| 2014/0116025 A1 | 5/2014 | Todorovic |
| 2014/0353399 A1 | 12/2014 | Stuart et al. |
| 2015/0027629 A1* | 1/2015 | Butler .................. G10K 11/172 |
| | | 264/267 |
| 2016/0186689 A1 | 6/2016 | Bartel et al. |
| 2016/0326985 A1 | 11/2016 | Hercock |

FOREIGN PATENT DOCUMENTS

| | | |
|---|---|---|
| WO | 9200183 A1 | 1/1992 |
| WO | 9619656 A1 | 6/1996 |
| WO | 2015006445 A1 | 1/2015 |

OTHER PUBLICATIONS

EPO Extended Search Report for related application 17188302.8 dated Jan. 19, 2018; 7 pp.

Extended European Search Report for Related Application No. 17188299.6-1014, dated Feb. 2, 2018, 8 Pages.

* cited by examiner

COMPRESSION MOLDING ASSEMBLY AND METHODS FOR MOLDING A THERMOPLASTIC BLOCKER DOOR

BACKGROUND

Exemplary embodiments disclosed herein relate generally to engine assemblies, and more particularly to a thermoplastic blocker door that may be utilized with an engine assembly.

Engine assemblies may include a fan assembly, a core gas turbine engine enclosed in an annular core cowl, and a fan nacelle that surrounds a portion of the core gas turbine engine. The fan nacelle is generally spaced radially outward from the annular core cowl such that the core cowl and the fan nacelle form a fan duct terminating in a fan exit nozzle. At least some engine assemblies include a thrust reverser assembly. The thrust reverser assembly may include a first fixed cowl and a second cowl that is axially translatable with respect to the first cowl. At least some thrust reverser assemblies include blocker doors or panels that are actively moved into the bypass duct as the thrust reverser is deployed through drag links or other mechanical means to block or impede the flow of bypass air through the fan exit nozzle. The bypass fan air may be diverted to provide reverse thrust for example through a series of turning vanes disposed in a cascade box.

At least some known blocker doors are fabricated from upper and lower skins that surround an aluminum honeycomb core coupled to the skins by an adhesive. The honeycomb core may include a denser portion for structural reasons and a less dense portion subject to less structural loads. Additionally, the denser honeycomb core portion may be filled in with a potting compound to enable the honeycomb core to sustain higher loads. However, in addition to increasing the weight of the blocker door, the potting compound has an undesirable effect on the sound attenuation characteristics of the honeycomb core.

BRIEF DESCRIPTION

In one aspect, a compression molding assembly for molding a honeycomb core of a blocker door is provided. The honeycomb core includes a plurality of cells defined by a plurality of walls. The compression molding assembly includes a ram plate comprising a plurality of openings defined therethrough and a plurality of core inserts coupled to the ram plate such that the plurality of core inserts are configured to form the honeycomb core of the blocker door. Each core insert is removably coupled with a respective opening of the plurality of openings such that each core insert is configured to form a respective cell of the plurality of cells.

In another aspect, a method of forming a blocker door using a compression molding assembly is provided. The blocker includes a honeycomb core having a plurality of cells defined by a plurality of walls. The method includes coupling a plurality of removable core inserts to a ram plate and loading a thermoplastic material into the compression molding assembly. The method also includes compressing the ram plate toward a forming assembly into the thermoplastic material and forming the plurality of cells using the plurality of core inserts.

DETAILED DESCRIPTION

Figure 1:
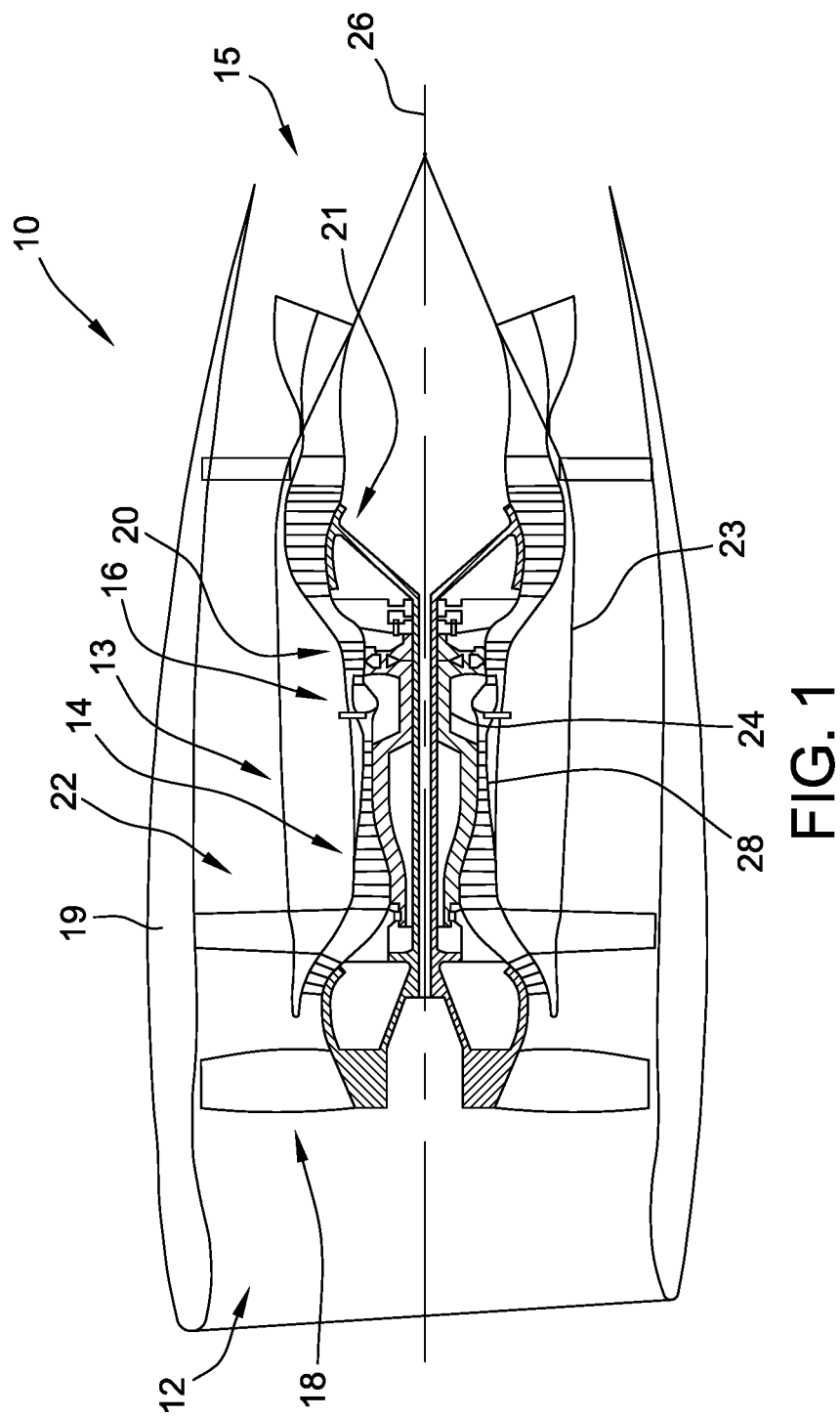
FIG. 1 is a schematic view of an exemplary engine assembly.

The embodiments herein describe a blocker door assembly for use in a gas turbine engine. The blocker door assembly includes a blocker door including plurality of a mounting structures and a body portion integrally formed with the mounting structures. Furthermore, the body portion is formed from a thermoplastic material using a thermoplastic forming process, such as, but not limited to, injection molding and compression molding. The blocker door also includes a facesheet coupled to the body portion, wherein the facesheet is also formed from a thermoplastic material. As such, the body portion and facesheet are able to be thermally or adhesively bonded together to form an integrated, single-piece component.

As described herein, the integrally formed thermoplastic blocker door has a number of advantages over conventional blocker doors made from different materials that are coupled together. For example, conventional blocker doors are fabricated from upper and lower skins that surround an aluminum honeycomb core coupled to the skins by an adhesive. The aluminum honeycomb core often includes standardized cell height and wall thickness. A portion of the honeycomb core may be filled in with a potting compound to enable the honeycomb core to sustain higher loads if the standardized sizes do not meet specifications. However, in addition to increasing the weight of the blocker door, the potting compound has an undesirable effect on the sound attenuation characteristics of the aluminum honeycomb core. The use of thermoplastic materials avoids the constraints of utilizing standard sized honeycomb and also avoids the use of the potting material filling of the honeycomb because the cell height and wall thickness can be customized to meet desired specification. Furthermore, different portions of the honeycomb body portion may have different cell sizes to account for different loading or noise attenuation requirements. Such customization of the honeycomb cell size enables increased noise attenuation. Additionally, the use of thermoplastic materials to replace aluminum skin and honeycomb results in both a reduced weight of the blocker door and lower cost due to reduced material and labor costs.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "first", "second", and "third" may be used interchangeably to distinguish one component from another and are not intended to signify location or importance of the individual components. The term "low coefficient of thermal expansion material" refers to a material which grows relatively less as the temperature increases.

As used herein, the terms "axial" and "axially" refer to directions and orientations that extends substantially parallel to a centerline of the turbine engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine outlet, or a component being relatively closer to the engine outlet as compared to another component. Moreover, the terms "radial" and "radially" refer to directions and orientations that extends substantially perpendicular to the centerline of the turbine engine.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown. The function of the gas turbine engine is to extract energy from high pressure and temperature combustion gases and convert the energy into mechanical energy for work. The gas turbine engine 10 has an engine inlet end 12 wherein air enters a core engine 13 after passing through a fan section 18. An engine nacelle 19 surrounds core engine 13 and fan section 18 such that a bypass duct 22 is defined between an outer wall 23 of core engine 13 and nacelle 19. Core engine 13 is defined generally by a compressor 14, a combustor 16, a multistage high pressure turbine (HPT) 20, and a separate low pressure turbine (LPT) 21. Collectively, the core engine 13 provides thrust or power during operation. The gas turbine engine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of a first shaft 24 about engine axis 26. The shaft 24 passes toward the front of the engine to continue rotation of the one or more compressor stages 14, a fan section 18 or inlet fan blades, depending on the turbine design. The fan section 18 is connected by a second shaft 28 to LPT 21 and creates thrust for the turbine engine 10 by exhausting air through an outlet end 15 of engine 10. LPT 21 may also be utilized to extract further energy and power additional compressor stages.

Figure 2:
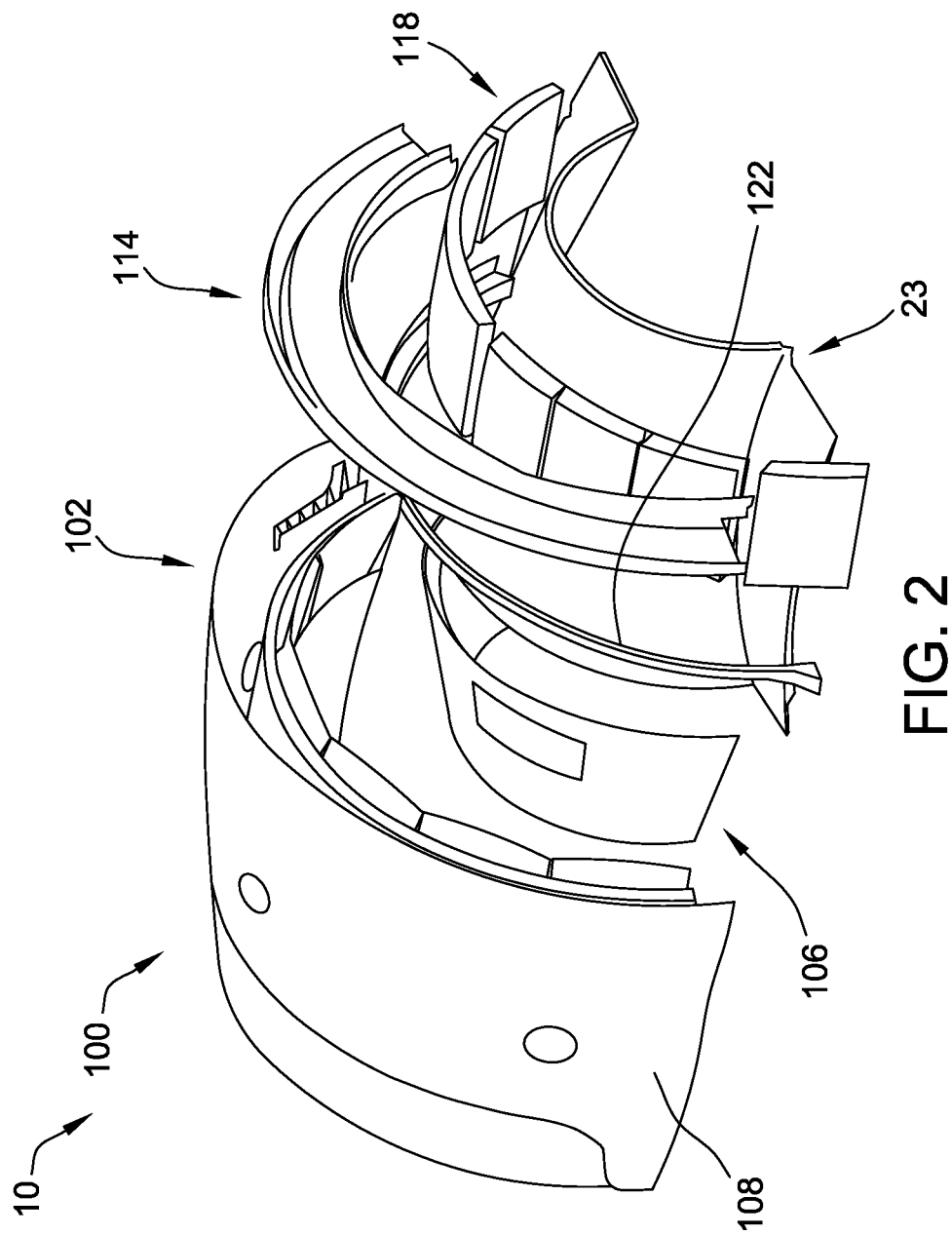
FIG. 2 is an exploded view of a portion of the engine assembly shown in FIG. 1
Figure 3:
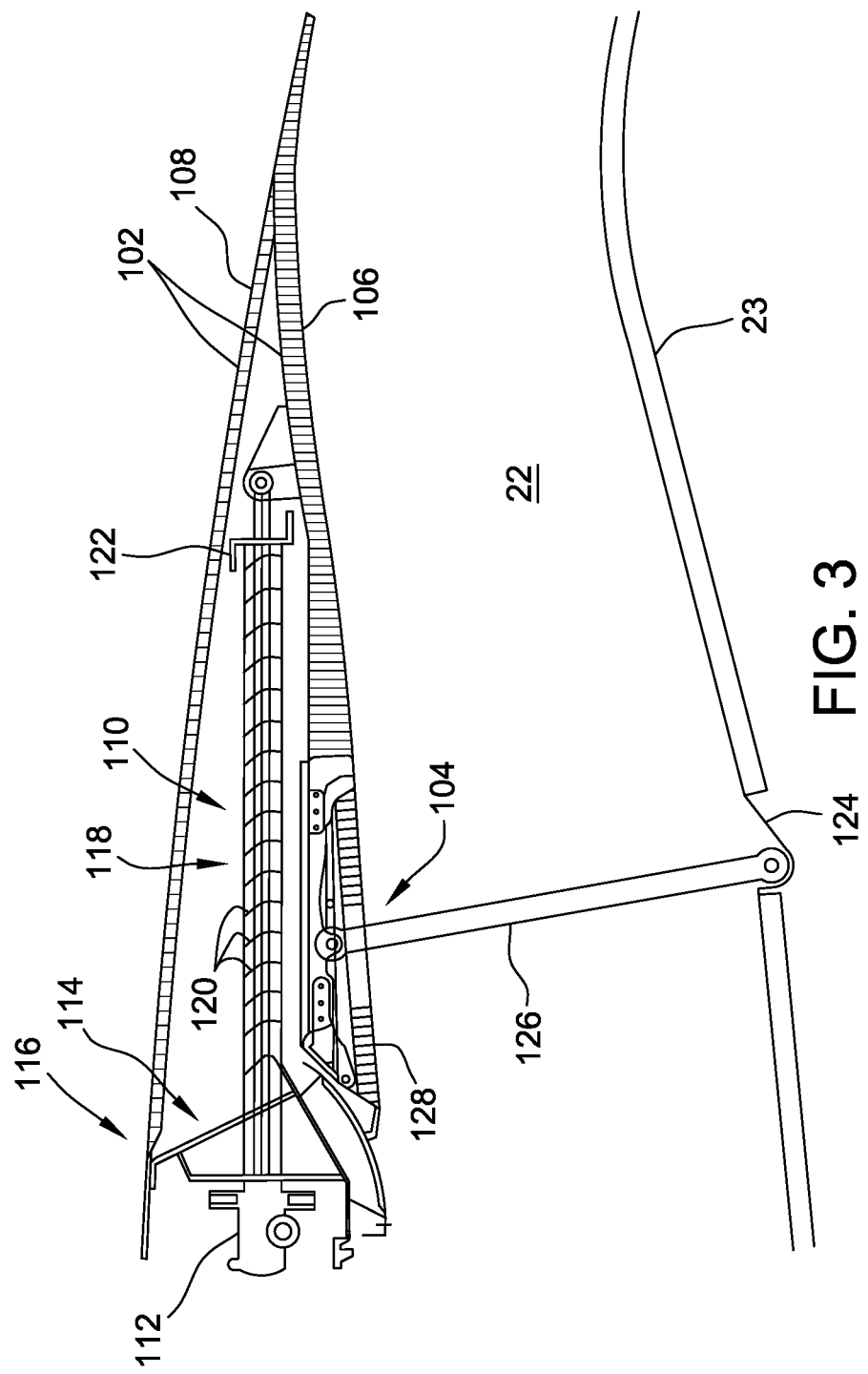
FIG. 3 is a side schematic view showing an exemplary thrust reverser assembly in a stowed disposition.
Figure 4:
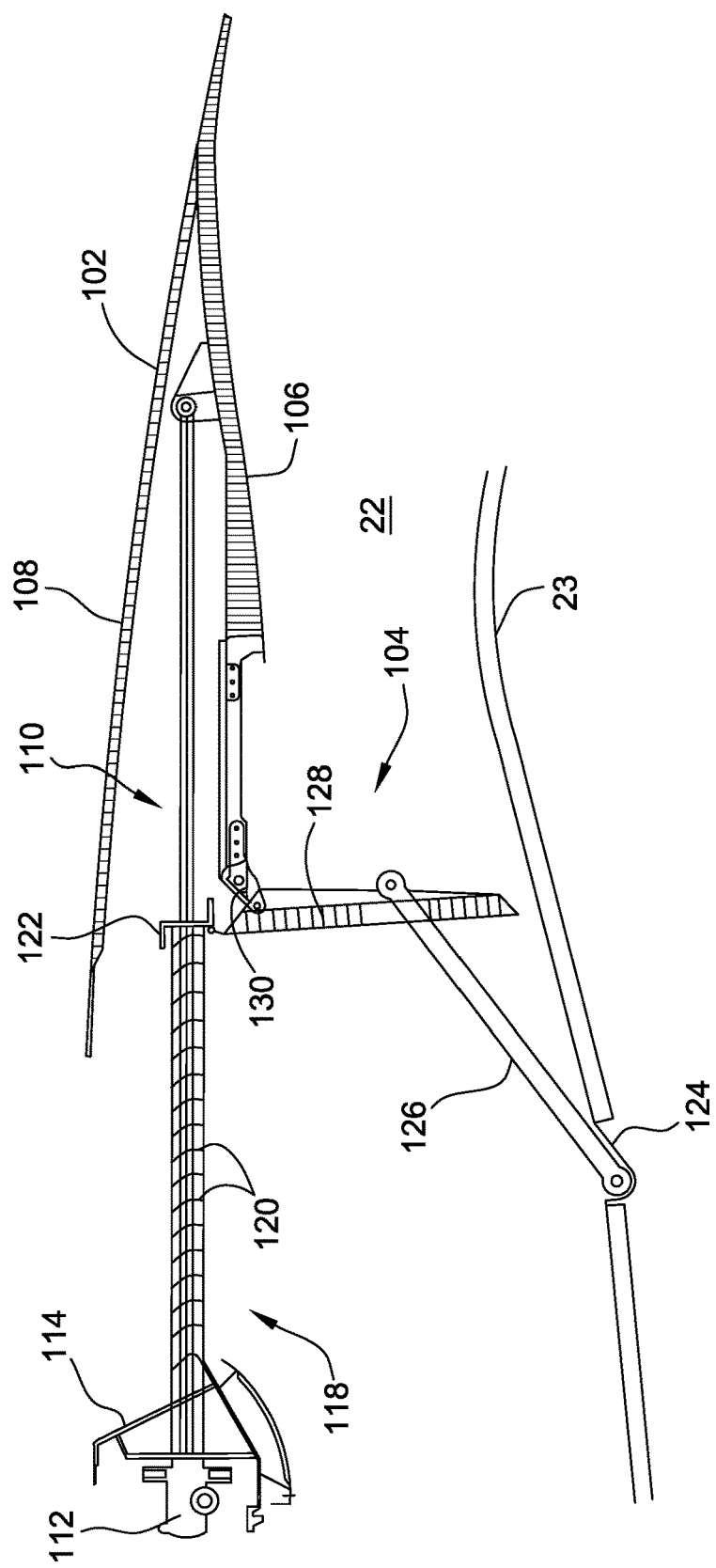
FIG. 4 is a side schematic view showing the thrust reverser assembly shown in FIG. 3 in a fully deployed disposition.

With reference to FIGS. 2-4, in an exemplary embodiment, engine 10 includes a thrust reverser assembly 100 includes a translatable cowl member 102 that defines a portion of nacelle 19. FIG. 2 is an exploded view of thrust reverser assembly 100. FIG. 3 is a side schematic view of thrust reverser assembly 100 illustrating translatable cowl member 102 and a blocker door assembly 104 a first operational position (i.e., a stowed position). FIG. 4 is a side schematic view of thrust reverser assembly 100 illustrating translatable cowl member 102 and blocker door assembly 104 a second operational position (i.e., fully translated). When the translatable cowl member 102 is fully translated, blocker door assembly 104 passively extends radially into bypass duct 22 to block or impede fan air from flowing through outlet end 15 (shown in FIG. 1) so that fan air is directed through thrust reverser assembly 100 to provide reverse thrust (i.e., full deployment of thrust reverser assembly).

In an exemplary embodiment, translatable cowl member 102 includes a radially inner panel 106 and a radially outer panel 108 being arranged and configured to define a space 110 therebetween. Thrust reverser assembly 100 includes an actuator assembly 112 coupled to translatable cowl member 102 and positioned at least partially within space 110 to selectively translate cowl member 102 in a generally axial direction. In the exemplary embodiment, actuator assembly 112 may be electrically, pneumatically, or hydraulically powered in order to translate cowl member 102 between the operational positions. A torque box 114 is coupled to actuator assembly 112 proximate a forward end 116 of translatable cowl member 102 and facilitates operation of actuator assembly 112.

The exemplary embodiment also includes a plurality of thrust reverser members 118 positioned within space 110 between the radially inner and outer panels 106 and 108, respectively, so as to be selectively covered and uncovered by translatable cowl member 102. Thus, when translatable cowl member 102 is disposed in the stowed operational position, thrust reverser member 118 is covered, and when translatable cowl member 102 is in the fully translated operational position, thrust reverser member 118 is uncovered. Appropriate flow directing members and seals are utilized in the exemplary embodiments to provide a sealing (e.g., air tight) engagement among components. In an exemplary embodiment, thrust reverser members 118 are fixed cascade structures including a plurality of cascade turning vanes 120. Furthermore, a support ring 122 is coupled to the aft ends of thrust reverser members 118 to provide support to members 118.

In operation, when the translatable cowl member 102 is in the stowed operational position (FIG. 3), air in bypass duct 22 is generally directed out outlet end 15 in a forward thrust operation. To provide reverse thrust, the translatable cowl member 102 is moved into the fully translated operational position (FIG. 4) whereby thrust reverser members 118 are uncovered and airflow is directed through turning vanes 120.

With particular reference to FIGS. 3 and 4, blocker door assembly 104 includes a base 124 coupled to outer wall 23 and a drag link 126 coupled to base 124 and extending through bypass duct 22. In the exemplary embodiment, blocker door assembly 104 also includes a blocker door 128 pivotally coupled to both drag link 126 and inner panel 106 of cowl member 102. Blocker door 128 is operable to move radially by turning about a hinge 129 when acted upon by sufficient air load when thrust reverser assembly 100 is fully deployed and the engine power and airflow is increased. As illustrated in FIG. 4 in an exemplary manner, blocker door 128 cooperates with outer wall 23 to block or impede airflow through bypass duct 22, and instead the airflow is directed through the thrust reverser assembly 100 and is turned by turning vanes 120 to provide reverse thrust. Thus, blocker door 128 is passively activated (e.g., by airflow) rather than being actively rotated by a mechanical actuator or other mechanism. Alternatively, blocker door 128 is actively controlled by a mechanical actuator or other mechanism.

Figure 5:
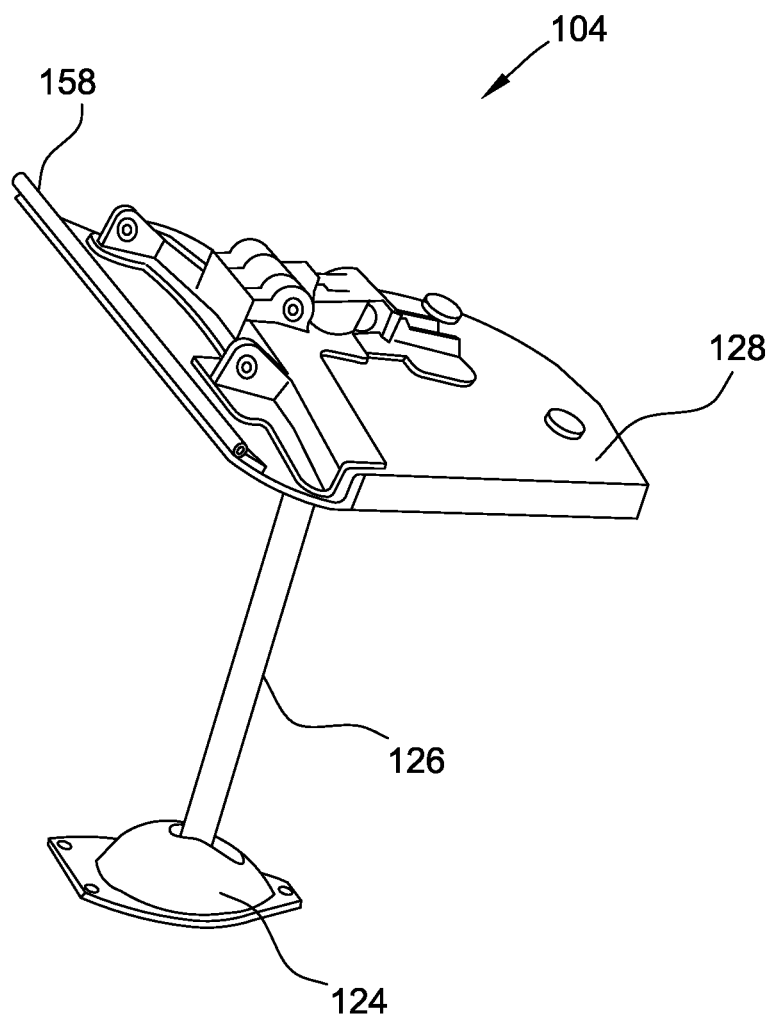
FIG. 5 is a perspective view of an exemplary blocker door assembly for use with the thrust reverser assembly shown in FIG. 3.
Figure 6:
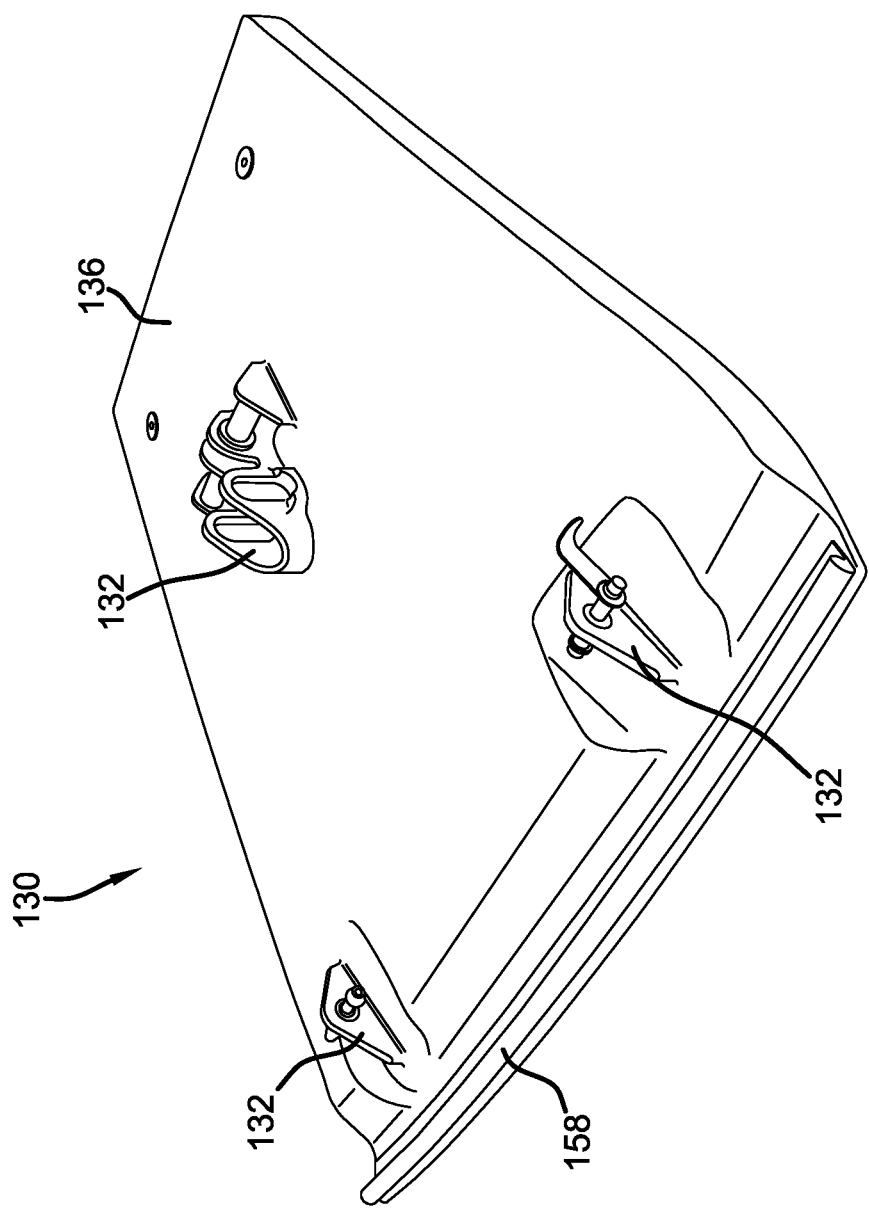
FIG. 6 is a top perspective view of one implementation of a blocker door body portion for use with the blocker door assembly shown in FIG. 5.
Figure 7:
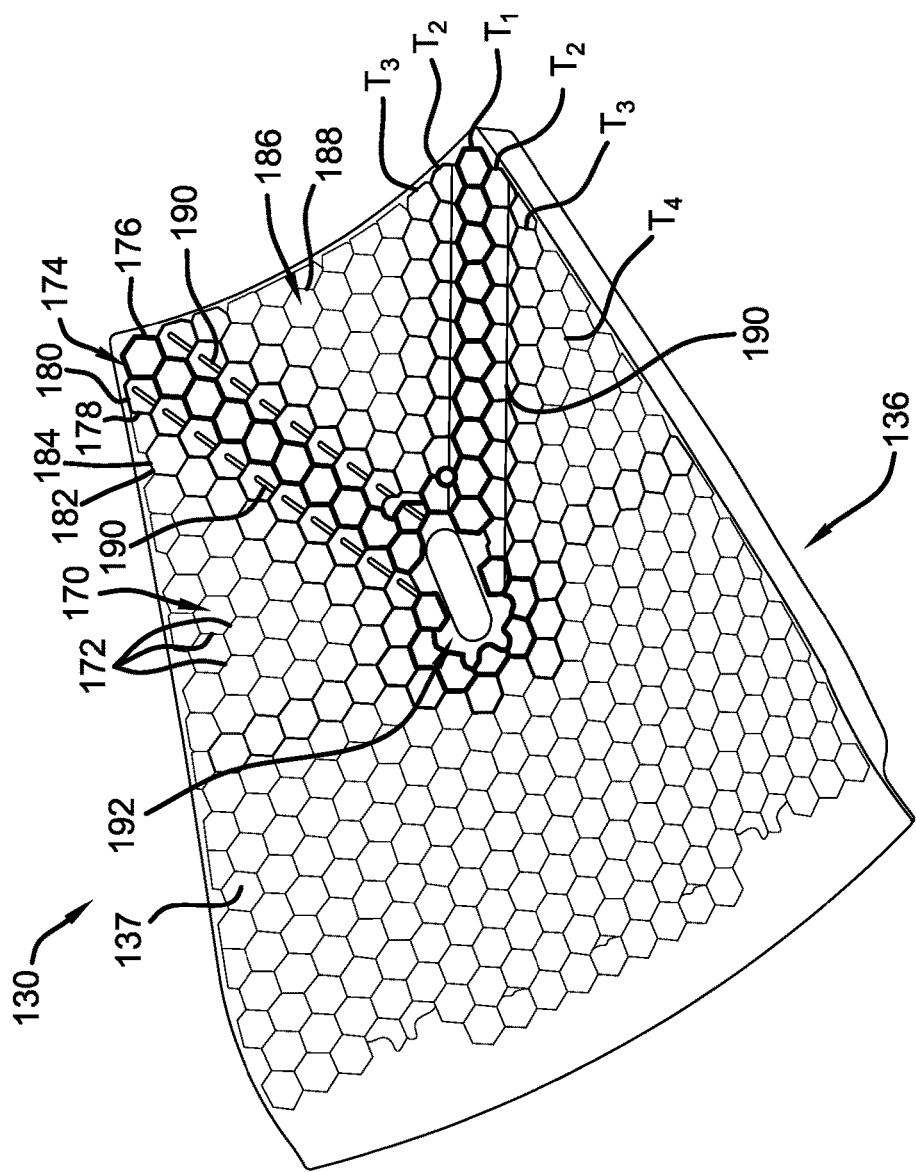
FIG. 7 is a bottom perspective view of the blocker door body portion shown in FIG. 6.

FIG. 5 is a perspective view of blocker door assembly 104 for use with the thrust reverser assembly shown in FIG. 3, FIG. 6 is a top view of a body portion 130 of blocker door 128, and FIG. 7 is a bottom view of body portion 130. . In the exemplary implementation, blocker door 128 includes a body portion 130, a plurality of mounting structures 132, and a facesheet 134. More specifically, body portion 130 is molded from a thermoplastic material such that body portion 130 is integrally formed with mounting structures 132. Molding of the thermoplastic material may be done by either injection molding or compression molding. In another implementation, any thermoplastic material molding process may be used to integrally form body portion 130 and mounting structures 132. In the exemplary implementation, the thermoplastic material includes at least one of polyetherether ketone, polyether sulfone, polyetherkeytone, polyphenylsulfone, polyphenylene sulfide and polyetherimide. In another implementation, the thermoplastic material includes any high temperature tolerant and chemically tolerant resin.

In the exemplary implementation, body portion 130 includes a backsheet 136 that is integrally formed, or co-molded, with a honeycomb core 137 from the thermoplastic material. More specifically, thermoplastic material is injection molded or compression molded to form backsheet 136 and honeycomb core 137. As described in further detail below, the use of thermoplastic materials allows both the cell wall height and thickness of honeycomb core 137 to be customized to meet desired specification. Furthermore, different portions of the honeycomb body portion may have different cell sizes to account for different loading or noise attenuation requirements. Such customization of the honeycomb cell size enables increased noise attenuation. Accordingly, mounting structures 132, backsheet 136, and honeycomb core 137 are all concurrently and integrally molded from the thermoplastic material.

As shown in FIG. 7, body portion 130 includes backsheet 136 integrally formed with honeycomb core 137. In the exemplary implementation, core 137 includes a plurality of cells 170 that include a plurality of walls 172 to form each cell 170. As described above, core 137 is customizable such that the thickness and height of walls 172 changes based on their location on body 130. More specifically, each set of cells 170 is defined by walls 172 having a predetermined thickness that is different from a wall thickness of every other set of cells.

In the exemplary implementation, plurality of cells 170 includes a first set of cells 174 that are defined by a first set of walls 176, a second set of cells 178 that are defined by a second set of walls 180, a third set of cells 182 that are defined by a third set of walls 184, and a fourth set of cells 186 that are defined by a fourth set of walls 188. More specifically, walls 176 of first set 174 include a first thickness T1 that is larger than a thickness T2 of walls 180 of second set 178. Similarly, walls 184 of third set 182 include a third thickness T3 that is smaller than thicknesses T1 and T2, but larger than a thickness T4 of walls 188 of fourth set 186. Although body portion 130 is shown as having four sets of cells 170 and walls 172, body portion 130 may have greater or fewer sets of cells 170 and walls 172. Generally, body portion 130 includes any number of sets of cells 170 and corresponding walls 172 as desired to facilitate operation of body portion 130 as described herein.

Body portion 130 also includes a plurality of stiffening ribs 190 that are integrally formed, or co-molded, with honeycomb core 137 and backsheet 136 to provide additional strength to body portion 130. Ribs 190 extend from backsheet 136 towards a distal end of walls 172. More specifically, ribs 190 extend a first distance from backsheet 136 and walls 172 extend a second distance that is larger than the first distance such that cells 170 are taller than ribs 190. In one implementation, ribs 190 includes a pair of ribs 190 that extend from a center area 192 of core 137 toward a corner of body portion 130. The pair of ribs 190 is parallel to one another to further strengthen body portion 130. Furthermore, ribs 190 extend adjacent to cell sets 174 and 178 having the thickest walls 176 and 180 such that the close positional relationship of ribs 190 and thick walls 176 and 180 provide a concentrated area of strength to body portion 130.

Figure 8:
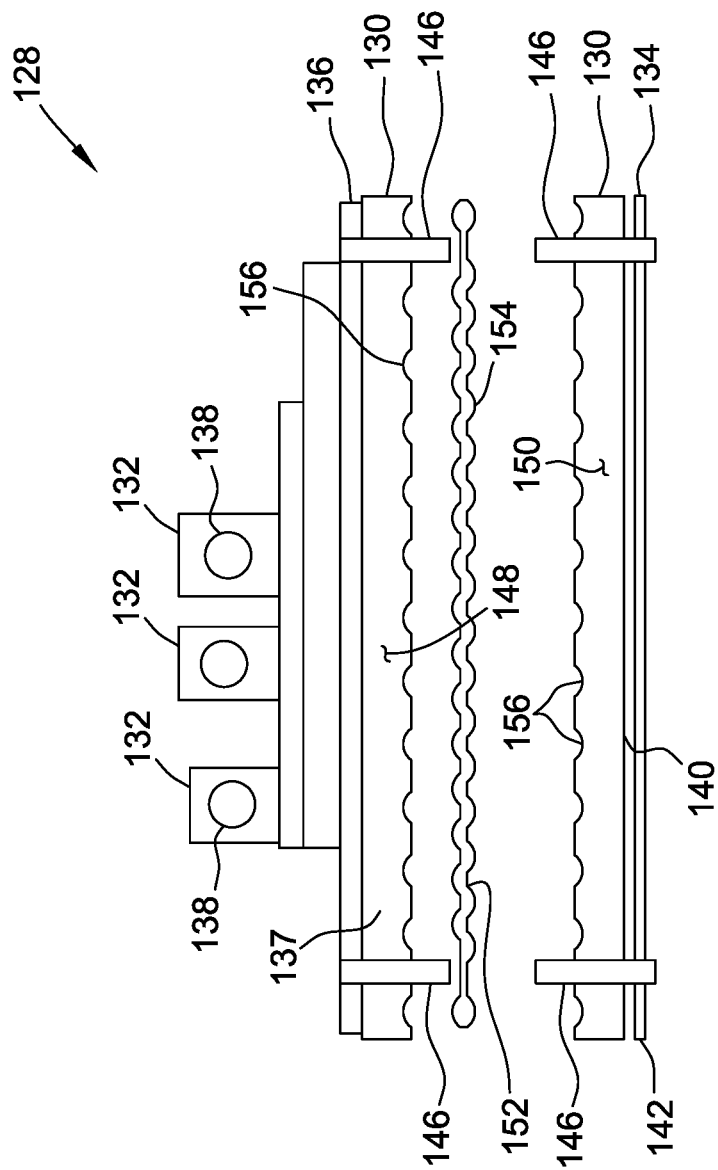
FIG. 8 is an exploded cross-sectional side view of another implementation of a blocker door for use with the blocker door assembly shown in FIG. 5
Figure 9:
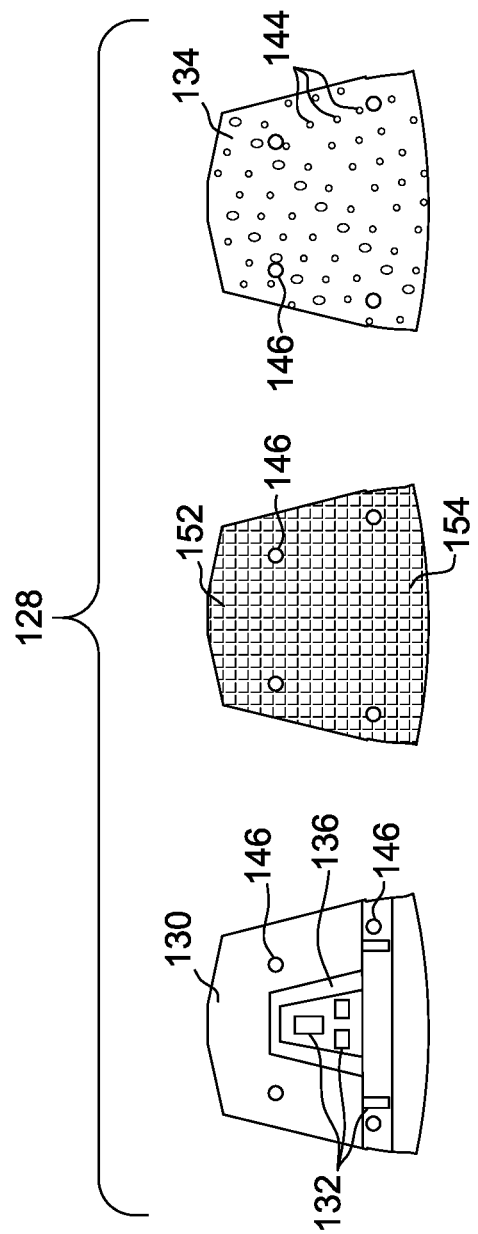
FIG. 9 is an exploded top view of the blocker door shown in FIG. 8.

FIG. 8 is a cross-sectional side view of blocker door 128 for use with blocker door assembly 104, and FIG. 9 is an exploded view of blocker door 128. In another implementation, backsheet 136 is a solid laminate structure over which thermoplastic material is injection molded or compression molded to form mounting structures 132 and body portion 130 around laminate backsheet 136. As such, mounting structures 132 are co-molded with body portion 130 such that mounting structures 132 and body portion 130 are integrally formed. In another implementation, mounting structures 132 are coupled to thermoplastic body portion 130 after formation of body portion 130. Additionally, machining of integrally-formed mounting structures 132, such as drilling of at least one through-hole 138, may be completed after forming body portion 130 about mounting structures 132.

In the exemplary implementation, facesheet 134 is coupled to an inner surface 140 of body portion 130 such that facesheet 134 is exposed to bypass duct 22 (shown in FIG. 4). In the exemplary implementation, facesheet 134 is formed from the same thermoplastic material as body portion 130. In another implementation, facesheet 134 is formed from a thermoplastic material different from the thermoplastic material that forms body portion 130. In yet another implementation, facesheet 134 is formed from a plurality of plies 142 of material. More specifically, facesheet 134 is formed from between approximately 3 and approximately 20 plies 142 that are compression molded together. The plurality of plies 142 may be thermoplastic material or may be a composite thermoplastic material, such as, but not limited to carbon fiber, or may be a thermoset material.

Furthermore, in the exemplary implementation, facesheet 134 includes a plurality of openings 144 (as shown in FIG. 9) formed therethrough. Openings 144 facilitate attenuating noise generated within engine 10 to reduce the amount of noise that escapes engine 10. In the exemplary implementation, each opening 144 includes a dimension of between approximately 0.02 inches (in.) and 0.06 in. More specifically, each opening 144 includes a dimension of approximately 0.04 in. In another embodiment, openings 144 include any dimension size that facilitates operation of blocker door 128 of blocker door assembly 104 as described herein. Additionally, openings 144 may be any shape, such as but not limited to, circular, elliptical, or rectangular that facilitates operation of blocker door 128 of blocker door assembly 104 as described herein. In the exemplary implementation, openings 144 are either co-formed with facesheet 134 via hot needle perforation or drilled (via gang-drilling or punch drilling) after formation of facesheet 134.

As described herein, in the exemplary implementation, facesheet 134 is coupled to body portion 130 using a thermal bonding process. Such thermal bonding thermally welds body portion 130 to facesheet 134 such that body portion 130 and facesheet 134 form an integral, single-piece component. In another implementation, facesheet 134 is coupled to body portion 130 using adhesive bonding. In yet another implementation, blocker door 128 includes a plurality of mechanical fasteners 146 that facilitate coupling facesheet 134 to body portion 130. Any combination of thermal bonding, adhesive bonding, and fasteners 146 may be used to couple facesheet 134 to body portion 130.

In one implementation, body portion 130 includes a first portion 148 and a second portion 150. In such configurations, blocker door 128 includes an intermediate sheet 152 coupled between first portion 148 and second portion 150. In the exemplary implementation, intermediate sheet 152 is formed from the same thermoplastic material as body portion 130. In another implementation, intermediate sheet 152 is formed from a thermoplastic material different from the thermoplastic material that forms body portion 130. In another implementation, intermediate sheet 152 is formed from a thin sheet of fabric. Intermediate sheet 152 includes a plurality of raised protrusions 154 that correspond to a plurality of recess 156 formed in body portion 130. Protrusions 154 of intermediate sheet 152, when combined with recesses 156 of body portions 148 and 150, facilitate attenuating noise generated within engine 10 to reduce the amount of noise that escapes engine 10. In another implementation, intermediate sheet 152 does not include protrusion 154 and is substantially flat. In the exemplary implementation, intermediate sheet 152 includes a thickness of between approximately 0.002 in. and 0.008 in. More specifically, intermediate sheet 152 includes a thickness of approximately 0.005 in. In another embodiment, intermediate sheet 152 includes any thickness that facilitates operation of blocker door 128 of blocker door assembly 104 as described herein.

As described above with respect to facesheet 134 and body portion 130, intermediate sheet 152 is coupled between first and second portions 148 and 150 of body portion 130 using a thermal bonding process. Such thermal bonding thermally welds intermediate sheet 152 between first and second portions 148 and 150 such that first and second portions 148 and 150, intermediate sheet 152, and facesheet 134 form an integral, single-piece component. In another implementation, intermediate sheet 152 is coupled between first and second portions 148 and 150 using adhesive bonding. In yet another implementation, mechanical fasteners 146 facilitate coupling intermediate sheet 152 between first and second portions 148 and 150. Any combination of thermal bonding, adhesive bonding, and fasteners 146 may be used to couple intermediate sheet 152 between first and second portions 148 and 150 of body portion 130.

In one implementation, blocker door 128 also includes a sealing element 158 (shown in FIG. 5) coupled about at least a portion of a perimeter of body portion 130. Sealing element 158 forms a seal between blocker door 128 and at least one of inner panel 106 of translating cowl assembly 102 (both shown in FIG. 3) and an inner panel 160 of torque box 114 (both shown in FIG. 3). As such, sealing element 158 prevents, or reduces, air from flowing from bypass duct 22 through translating cowl assembly 102 when blocker door assembly 104 is not deployed, as shown in FIG. 3.

Figure 10:
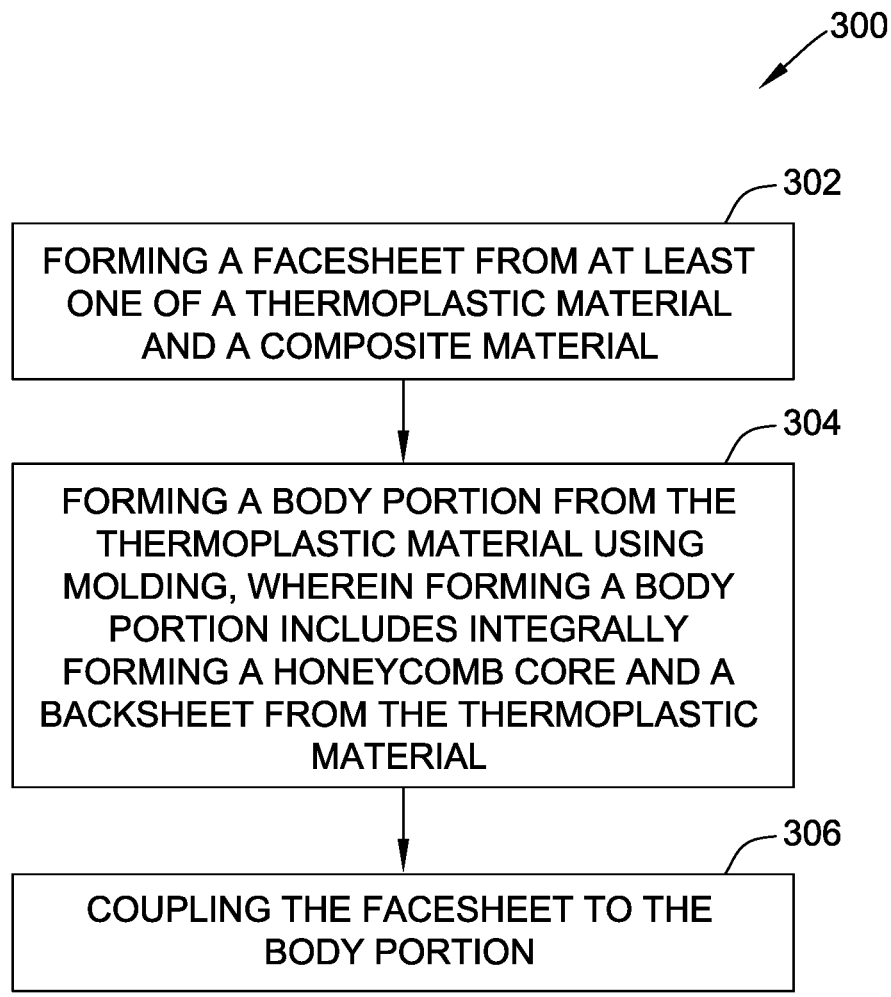
FIG. 10 is a flow chart illustrating an exemplary method of manufacturing the blocker door shown in FIG. 5.

FIG. 10 is a flow chart illustrating an exemplary method 300 of manufacturing blocker door 128. Method 300 includes forming 302 a facesheet, such as facesheet 134, from at least one of a thermoplastic material and a composite material and forming 304 a body portion, such as body portion 130, from a thermoplastic material using one of injection molding, compression molding, or another thermoplastic molding process. In one implementation, forming 304 includes forming integrally forming a honeycomb core, such as core 137, and a backsheet, such as backsheet 136 from the thermoplastic material. Method 300 further includes coupling 308 the facesheet to the body portion using at least one of thermal bonding, adhesive bonding, and a plurality of mechanical fasteners.

Figure 11:
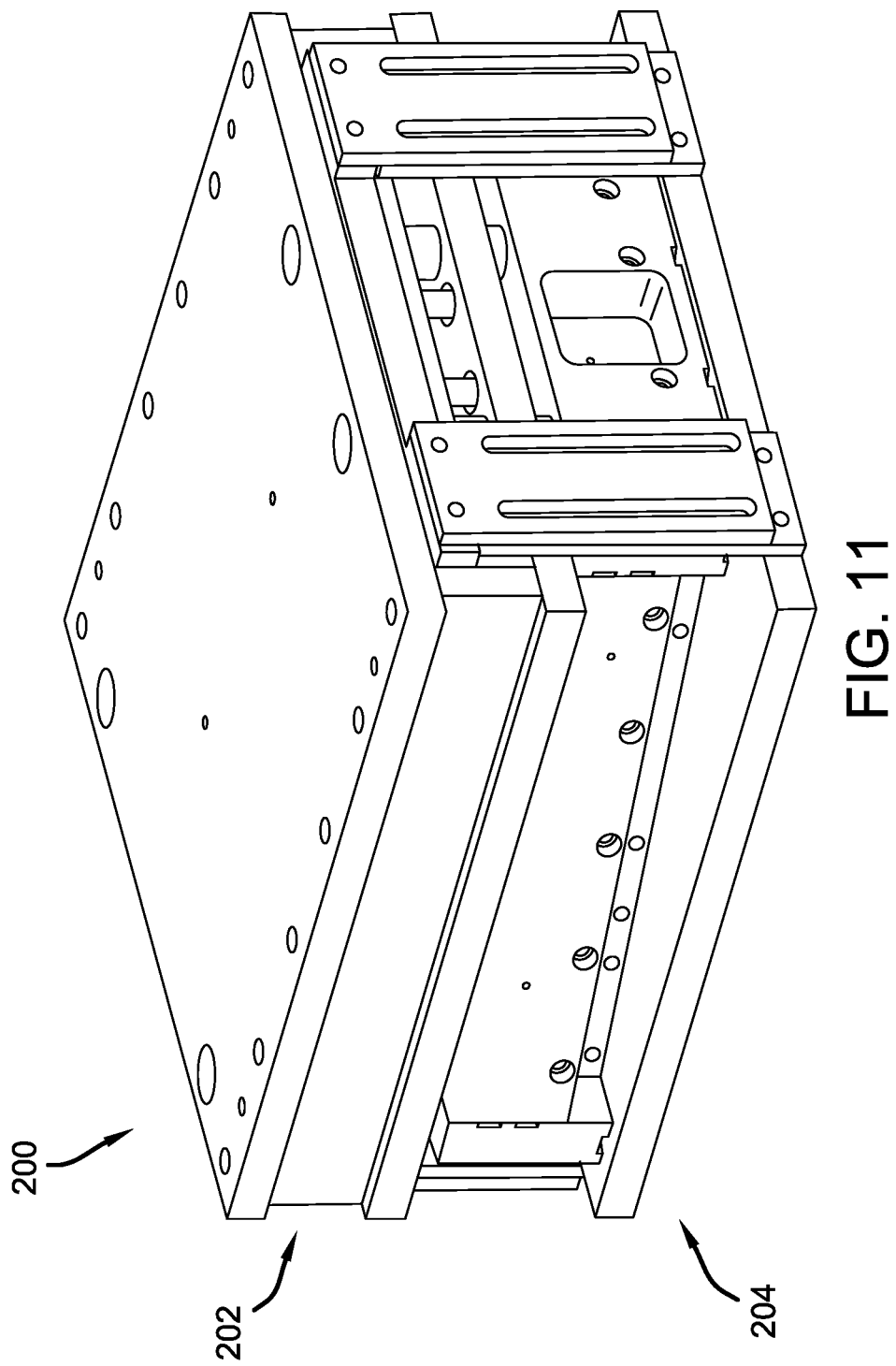
FIG. 11 is a perspective view of a compression molding assembly that may be used to mold the blocker door body portion shown in FIG. 6.

FIG. 11 is a perspective view of a compression molding assembly 200 that may be used to compression mold body portion 130 (shown in FIGS. 6 and 7) of blocker door 128 (shown in FIG. 5). More specifically, assembly 200 is used to integrally form backsheet 136 and honeycomb core 137. In the exemplary implementation, assembly 200 includes an upper molding assembly 202 and a lower molding assembly 204 that combine to compression mold body portion 130 from thermoplastic material in a single piece.

Figure 12:
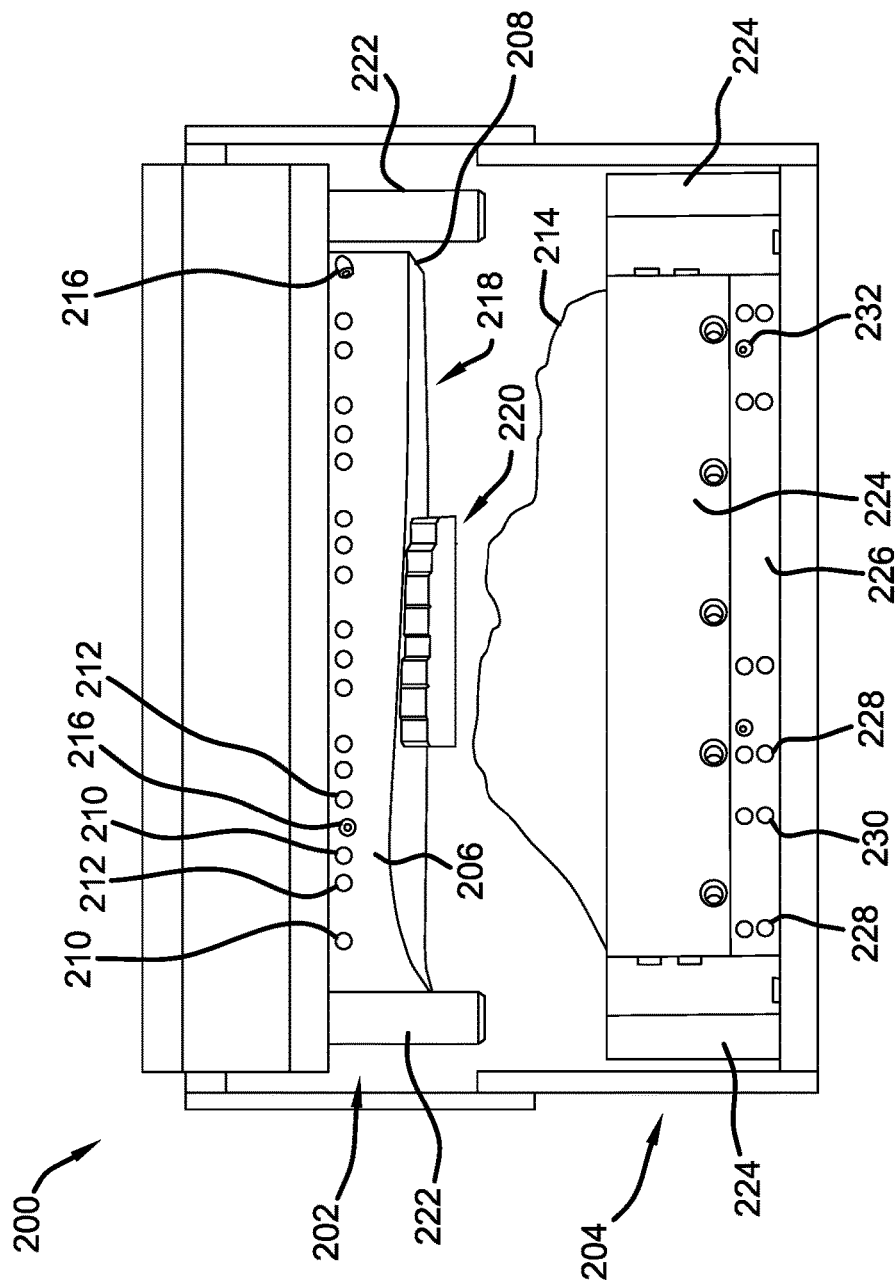
FIG. 12 is a side view of the compression molding assembly prior to molding of the blocker door body portion.
Figure 13:
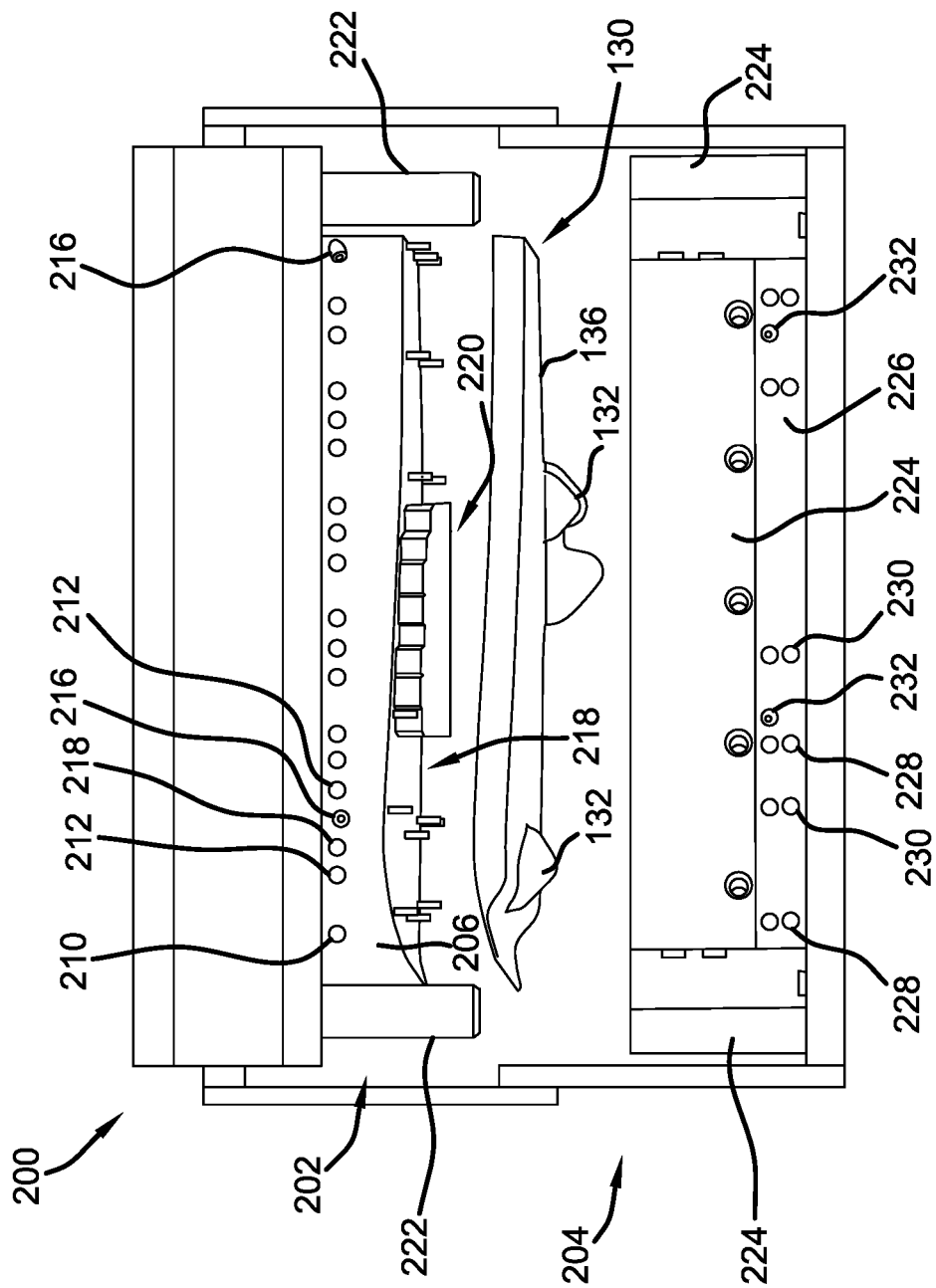
FIG. 13 is a side view of the compression molding assembly after molding of the blocker door body portion.

FIG. 12 is a side view of compression molding assembly 200 prior to molding of blocker door body portion 130, and FIG. 13 is a side view of compression molding assembly 200 after molding of blocker door body portion 130. As shown in FIGS. 12 and 13, upper molding assembly 202 includes a ram plate 206 including a lower surface 208 that defines the profile of body portion 130. Ram plate 206 also includes a plurality of heating channels 210 and a plurality of cooling channels 212 alternatingly-spaced across ram plate 206. Channels 210 and 212 are configured to either bring heat to or remove heat from a thermoplastic material 214 during molding to facilitate melting material 214 for molding or curing material 214 after molding. A plurality of thermocouples 216 are also housed within ram plate 206 to measure the temperature of ram plate 206 and/or material 214.

In the exemplary implementation, ram plate 206 also includes a plurality of openings 218 defined therethrough. Openings 218 are defined in surface 208 and extend through ram plate 206 perpendicular to channels 210 and 212. Upper molding assembly 202 further includes a plurality of core inserts 220 removably coupled to ram plate 206 such that each opening 218 receives a respective one of core inserts 220. As described herein, core inserts 220 are removably coupled with a respective opening 218 of the plurality of openings 218 and facilitate forming honeycomb core 137 of the blocker door body portion 130. More specifically, each core insert 220 forms a respective cell 170 (shown in FIG. 7) of plurality of cells 170 and the gap (not shown in FIG. 12 or 13) between adjacent core inserts 220 form a respective wall 172 (shown in FIG. 7) of plurality of walls 172.

In the exemplary implementation, upper molding assembly 202 also includes a plurality of guide pins 222 that guide ram plate 206 towards lower molding assembly 204 during molding. In another implementation, guide pins 222 are positioned outside upper molding assembly 202 and/or insulated to prevent guide pins 222 from thermal expansion. As described in further detail herein, lower molding assembly 204 includes a plurality of sidewalls 224 and a forming plate 226 that combine to define a cavity (not shown in FIG. 12 or 13) in which material 214 is loaded for molding. Forming plate 226 also includes a plurality of heating channels 228 and a plurality of alternatingly-spaced cooling channels 230. As in ram plate 206, channels 228 and 230 are configured to either bring heat to or remove heat from a thermoplastic material 214 during molding to facilitate melting material 214 for molding or curing material 214 after molding. A plurality of thermocouples 232 are also housed within forming plate 226 to measure the temperature of forming plate 226 and/or material 214.

Figure 14:
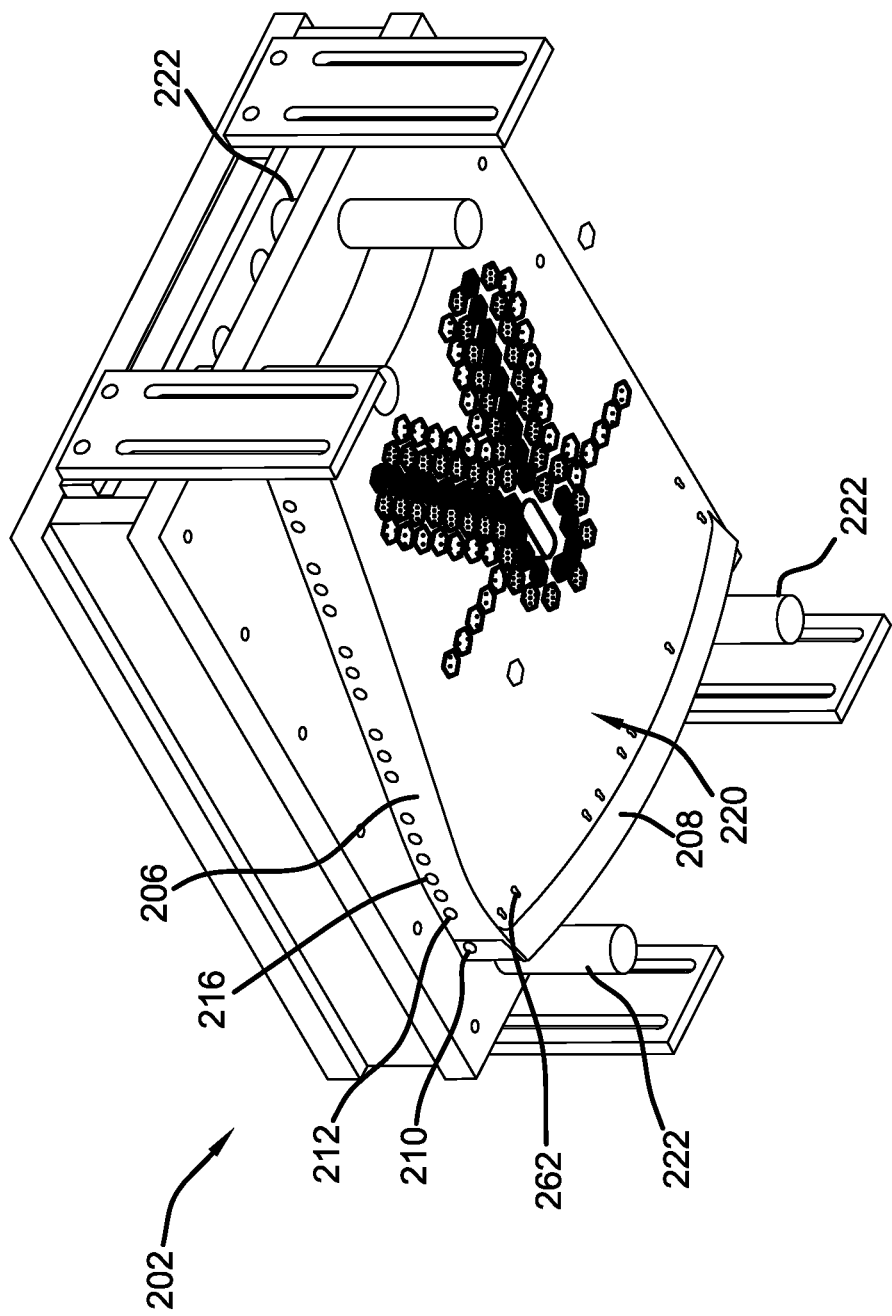
FIG. 14 is a perspective bottom view of a upper molding assembly that may be used with the compression molding assembly.
Figure 15:
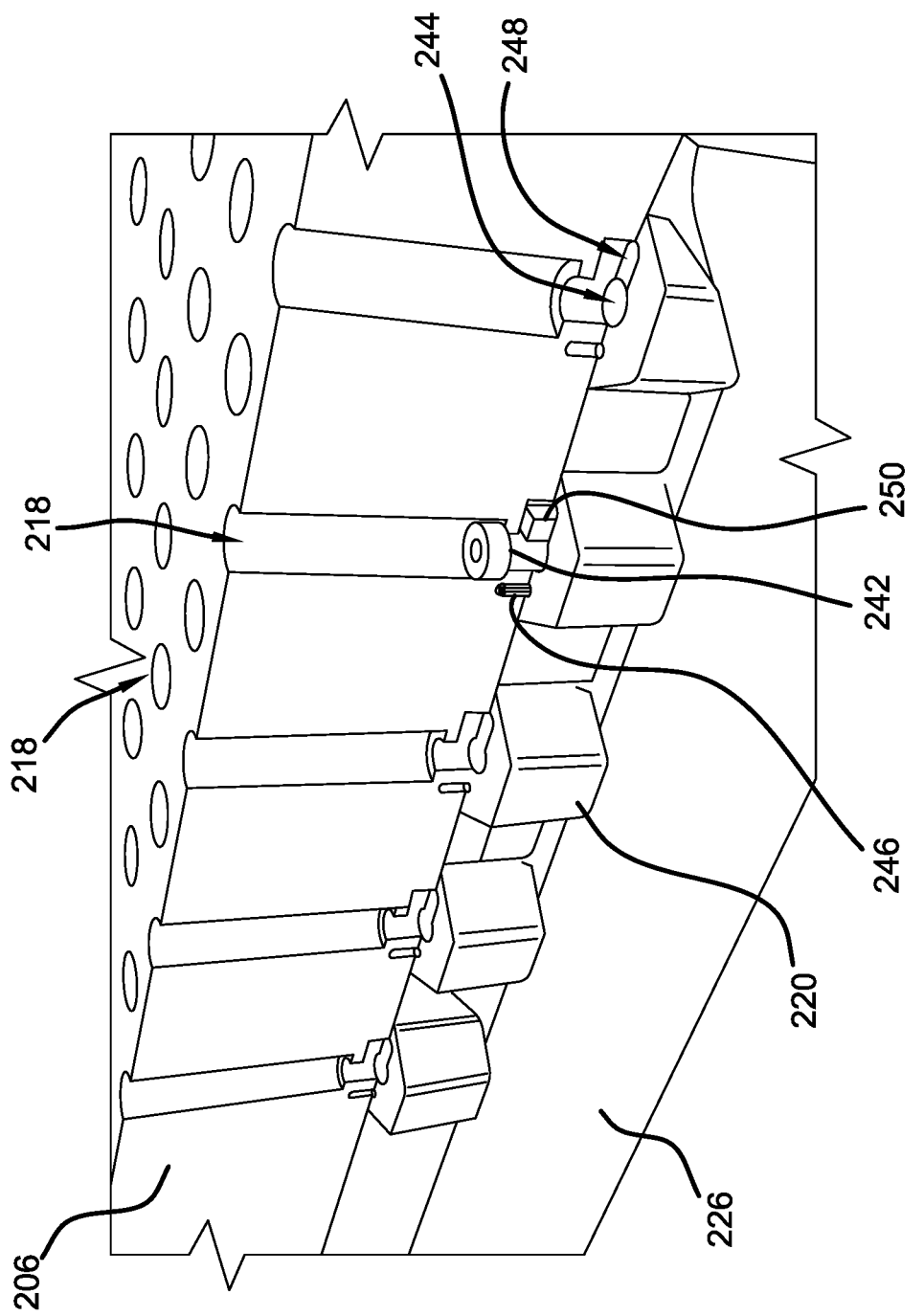
FIG. 15 is a perspective cross-sectional view of a portion of the compression molding assembly illustrating a ram plate and a plurality of core inserts.
Figure 16:
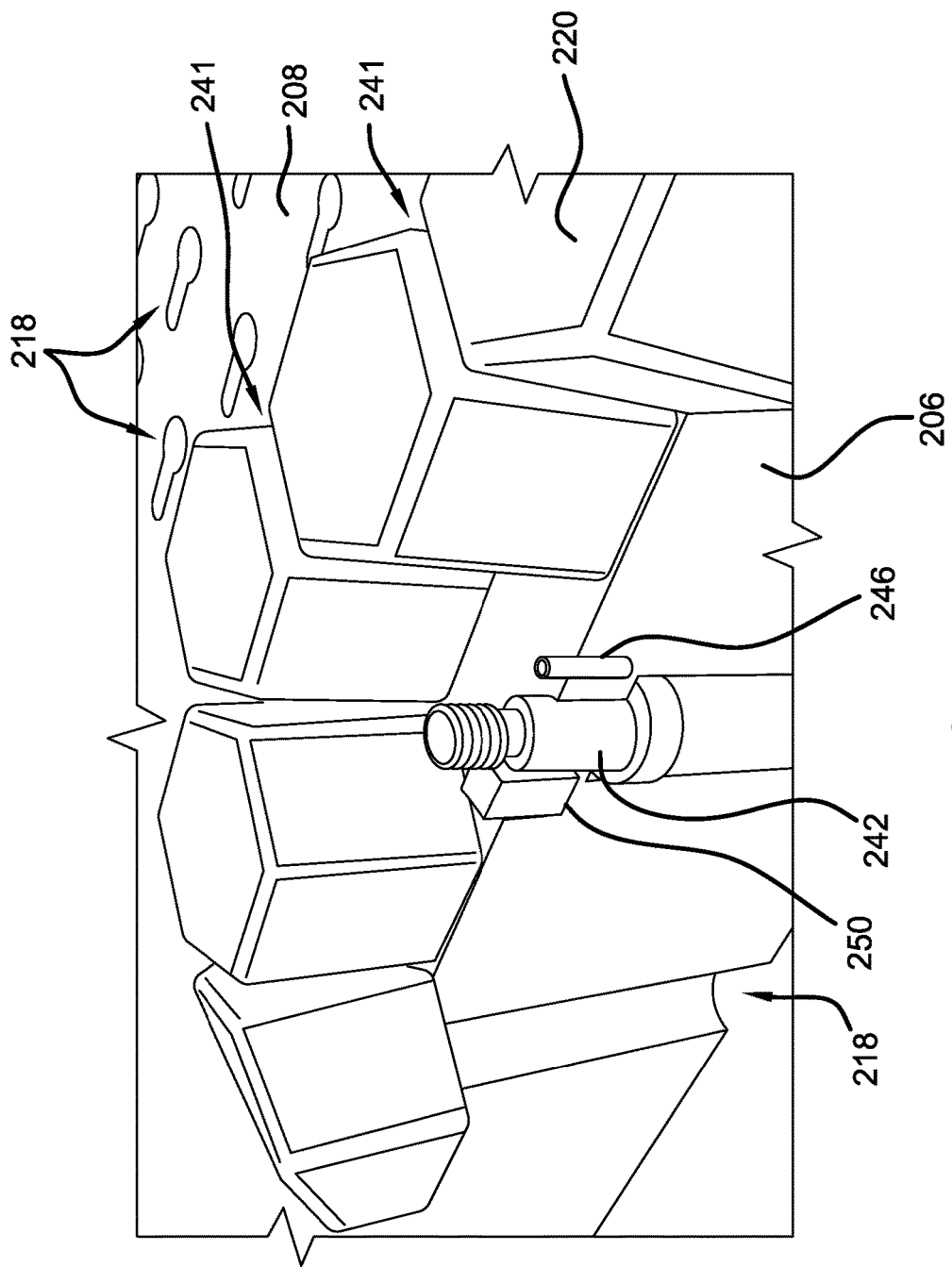
FIG. 16 is a perspective cross-sectional view of a portion of the compression molding assembly illustrating the ram plate and the plurality of core inserts.

FIG. 14 is a perspective bottom view of upper molding assembly 202 illustrating ram plate 206 and core inserts 220. FIGS. 15 and 16 are perspective cross-sectional views ramp plate 206, core inserts 220, and forming plate 226. In the exemplary implementation, core inserts 220 includes a plurality of sets of core inserts, wherein each set of core inserts 220 is a different size than every other set of core inserts 220. More specifically, as shown in FIG. 14, upper molding assembly 202 includes a first set 234 of inserts 220, a second set 236 of inserts 220, a third set 238 of inserts 220, and a fourth set 240 of inserts 220. Each set 234, 236, 238, and 240 is different in size than every other set 234, 236, 238, and 240. For example, first set 234 includes a first size of inserts 220 and second set 236 includes a second size of inserts 220 that is different than the first size. Although upper molding assembly 202 is shown as having four sets of inserts 220, upper molding assembly 202 may have greater or fewer sets of inserts 220. Generally, upper molding assembly 202 includes any number of sets of inserts 220 as desired to facilitate operation of upper molding assembly 202 as described herein.

In the exemplary implementation, each insert 220 is removable coupled to ram plate 206 such that each insert is interchangeable to facilitate tailoring the size of cells 170 in body portion 130 to meet desired strength requirements of body portion 130. More specifically, smaller inserts 220 may be coupled to ram plate 206 in an area where increased strength is desired in body portion 130. Because gaps 241 between adjacent inserts 220 define a thickness of walls 172 of honeycomb core cells 170, the smaller the inserts 220, the larger the wall thickness, and thus the increase in strength in that region of body portion 130. Similarly, in areas where an increased strength is not required, larger inserts 220 can be used to decrease the wall thickness and, thus, decrease the weight of body portion 130. As such, the wall thickness of each cell 170 of honeycomb core 137 is able to be tailored based on the size of the insert 220 used for that cell 170, wherein the size of insert 220 is based on a desired load capacity at the location of that cell 170 in core 137.

As shown in FIGS. 15 and 16, each core inserts 220 is coupled to ram plate 206 using one of a plurality of removable fasteners 242. In the exemplary implementation, fasteners 242 are inserted through opening 218 and into an opening 244 defined in core insert 220. Opening 244 and a portion of fastener 242 are threaded to facilitate coupling. An optional indexing pin 246 is coupled between each core insert 220 and ram plate 206 to facilitate insertion of core insert in the proper orientation. Additionally, opening 244 includes a keyhole 248 configured to receive a key 250 to prevent rotation of core insert 220.

Figure 17:
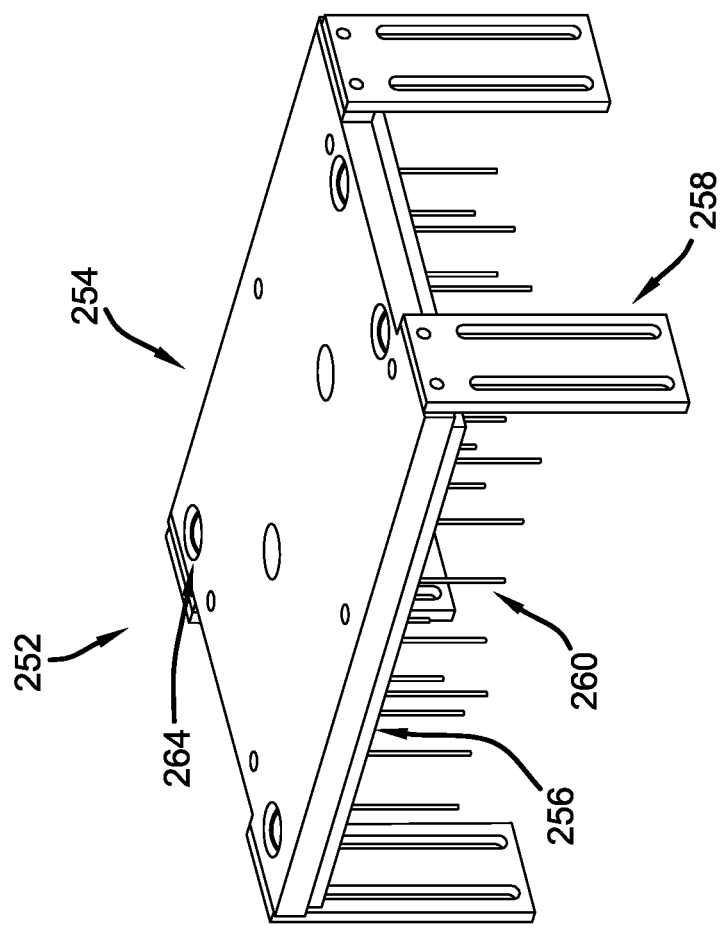
FIG. 17 is a perspective view of an ejector assembly that may be used with the compression molding assembly.

FIG. 17 is a perspective view of an ejector assembly 252 that may be used with compression molding assembly 200 to eject molded blocker door body portion 130 from upper molding assembly 202. In the exemplary implementation, ejector assembly 252 includes an ejector plate 254 and an ejector retainer plate 256 coupled to both ejector plate 254 and to ram plate 206. A plurality of ejector control plates 258 are coupled to ejector plate 254 and facilitate movement of ejector assembly 252 and upper molding assembly 202 toward lower molding assembly 204. Ejector assembly 252 also includes a plurality of ejector pins 260 that extend through a plurality of pin openings 262 (shown in FIG. 14) formed in ram plate 206. In operation, as upper molding assembly 202 is moved away from lower molding assembly 204, fully formed body portion 130 is also lifted therewith. Ejector assembly 252 may either then be lowered toward upper molding assembly 202 or held stationary and upper molding assembly 202 moved toward ejector assembly 252 to eject body portion 130 from upper molding assembly 202. Plates 254 and 256 include guide post openings 264 to allow ejector assembly 252 to move along guide pins 222. As upper molding assembly 202 and ejector assembly 252 come together, ejector pins 260 extend through pin openings 262 in ram plate 206 and detach body portion 130 from ram plate 206.

Figure 18:
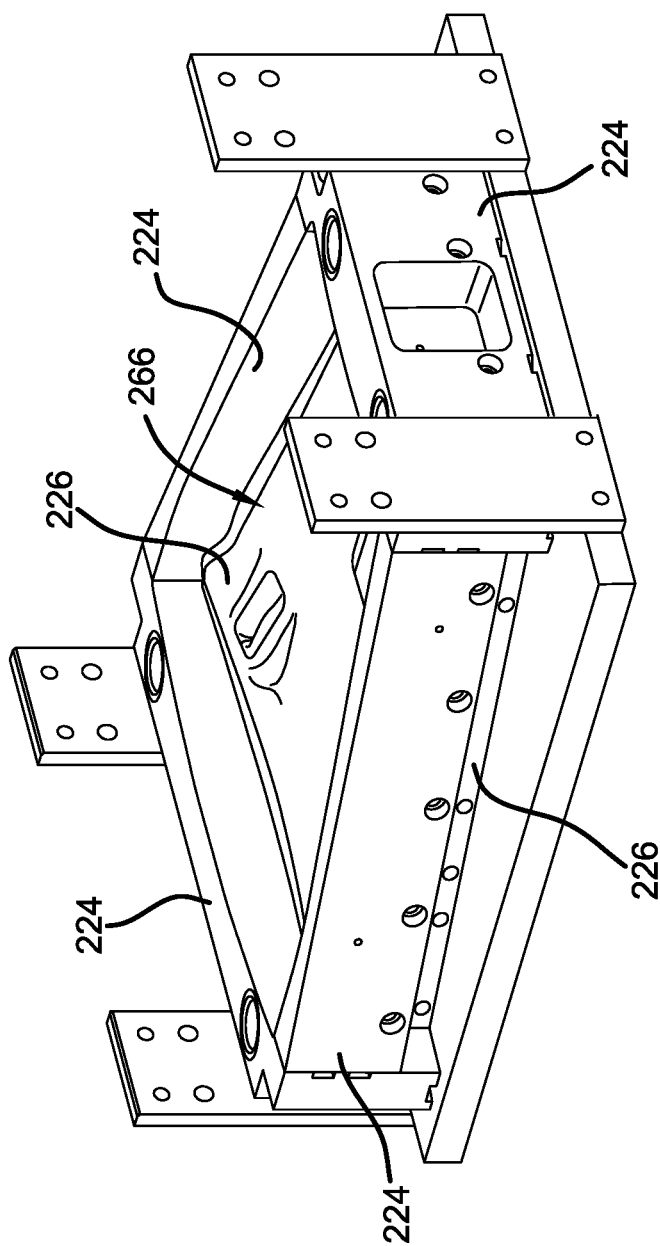
FIG. 18 is a perspective view of a lower molding assembly that may be used with the compression molding assembly.

FIG. 18 is a perspective view of lower molding assembly 204 illustrating sidewalls 224 coupled to forming plate 226. In the exemplary implementation, sidewalls 224 and forming plate 226 form a cavity 266 in which thermoplastic material 214 is loaded to mold blocker door body potion 130. Sidewalls 224 form the perimeter of body portion 130 and are removable and interchangeable to enable different sidewalls 224 to be used based on a desired property of body portion 130. For example, if a specific feature is desired along a portion of the perimeter of body portion 130, then a sidewall 224 having the desired feature may be positioned in lower molding assembly 204. Then, when the feature is no longer desired, the original sidewall 224 may be positioned in assembly 204. Alternatively, the desired featured may be machined into one or more sidewalls 224 and not into the remaining sidewalls 224, then the machined sidewall 224 may be returned to assembly 204.

Figure 19:
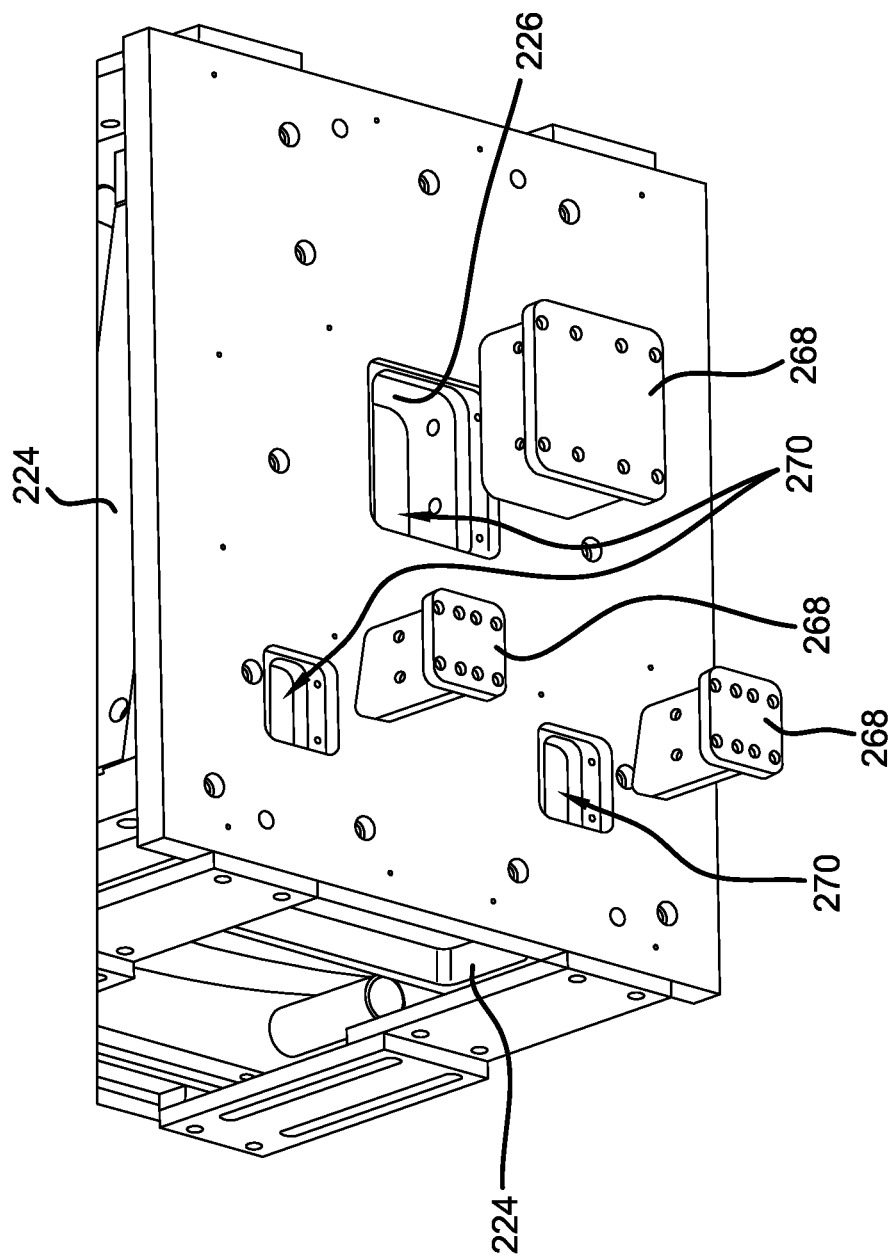
FIG. 19 is a bottom perspective view of the lower molding assembly shown in FIG. 18 illustrating a plurality of removable mounting structure inserts.

FIG. 19 is a bottom perspective view of lower molding assembly 204 illustrating a plurality of removable mounting structure inserts 268. Each mounting structure insert 268 forms a mounting structure 132 on body portion 130 and is inserted through a corresponding opening 270 in forming plate 226. Mounting structure inserts 268 form at least one of a hinge structure or a draglink structure on body portion 130. Alternatively, a mounting structure 268 may be used that doesn't form a structure on body portion 130. Similar to sidewalls 224, mounting structure inserts 268 are removable and interchangeable to enable different mounting structure inserts 268 to be used based on a desired mounting structure of body portion 130. Furthermore, mounting structure inserts 268 are modular to enable each insert 268 to change shape to form a different mounting structure 132 based on a predetermined desired mounting structure 132 without having to change other components of compression molding assembly 200.

Figure 20:
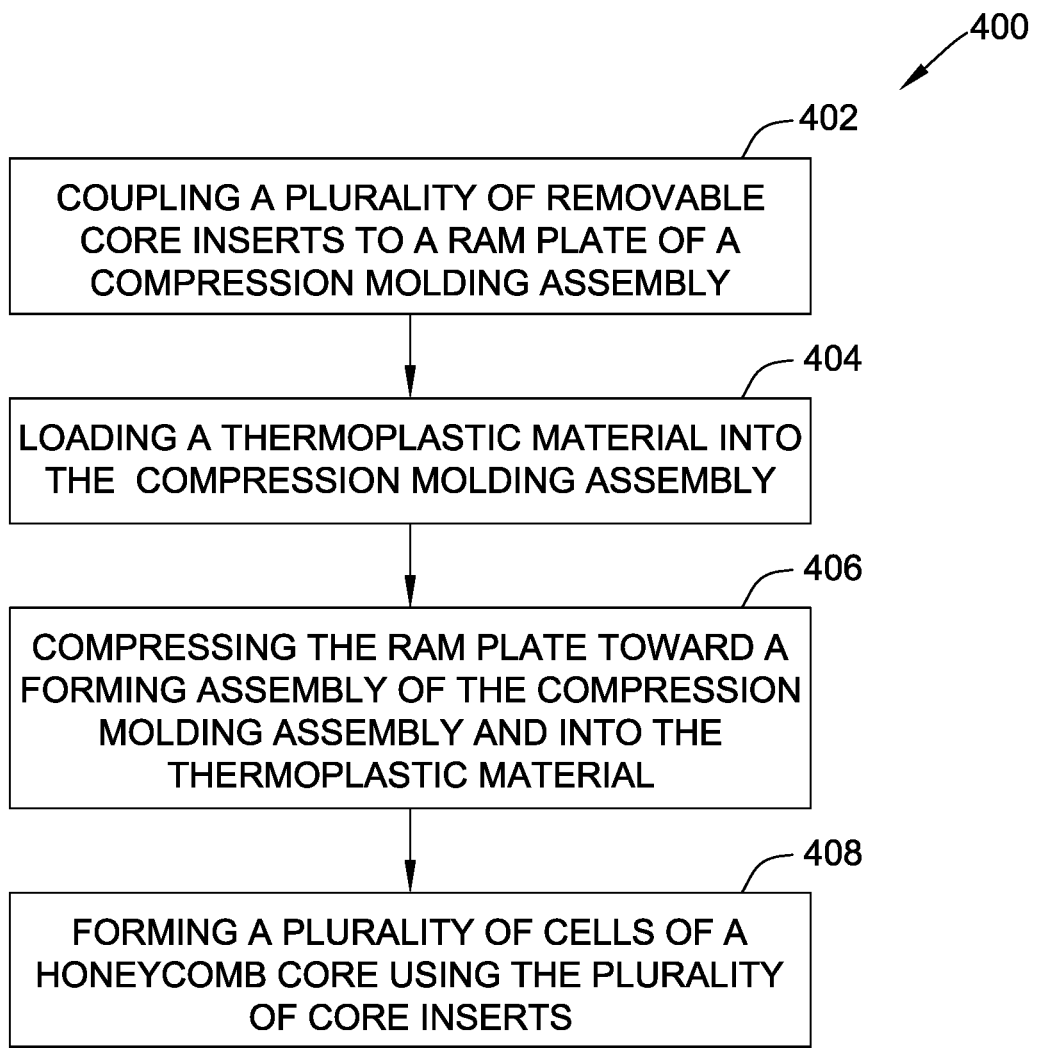
FIG. 20 is a flow chart illustrating an exemplary method of manufacturing the blocker door using the compression molding assembly.

FIG. 20 is a flow chart illustrating an exemplary method 400 of forming body portion 130 of blocker door 128 using compression molding assembly 200. As described above, body portion 130 includes honeycomb core 137 including plurality of cells 170 defined by a plurality of walls 172. Method 400 includes coupling 402 the plurality of removable core inserts 220 to ram plate 206 of compression molding assembly 200. More specifically, coupling 402 core inserts 220 includes coupling 402 the plurality of sets 234, 236, 238, and 240 of core inserts 220, wherein each set of core inserts is a different size than every other set of core inserts. For example, the coupling 402 step includes coupling a first set 234 of core inserts to ram plate 206, wherein first set 234 of core inserts are a first size, and coupling 402 a second set 236 of core inserts to ram plate 206, wherein second set 236 of core inserts are a second size that is different from the first size.

Method 400 also includes loading 404 thermoplastic material 214 into compression molding assembly 200. More specifically, material 214 is loaded 404 into cavity 266 formed by sidewalls 224 and forming plate 226 of lower molding assembly 204. Ram plate 206 is then compressed 404 toward forming assembly 204 into the thermoplastic material 214, and the plurality of cells 170 of honeycomb core 137 are then formed 408 using the plurality of core inserts 220. Forming 408 the plurality of cells 170 includes forming a first set of cells 174 with a first set 234 of core inserts 220 of the plurality of core inserts and forming a second set 178 of cells with a second set 236 of core inserts 220 of the plurality of core inserts.

The embodiments herein describe a blocker door assembly for use in a gas turbine engine. The blocker door assembly includes a facesheet including a plurality of openings to facilitate noise attenuation and a body portion coupled to the facesheet. The body portion includes a backsheet integrally formed with a honeycomb core, wherein the body portion is molded from a thermoplastic material using one of injection molding, compression molding, or another thermoplastic molding process. Also described herein is a compression molding assembly for molding the honeycomb core of the blocker door, wherein the honeycomb core includes a plurality of cells defined by a plurality of walls. The compression molding assembly includes a ram plate including a plurality of openings defined therethrough and a plurality of core inserts coupled to the ram plate. The core inserts are configured to form the honeycomb core of the blocker door. Each core insert is removably coupled with a respective opening of the plurality of openings in the ram plate such that each core insert is configured to form a respective cell of the plurality of cells.

As described herein, the integrally formed thermoplastic blocker door has a number of advantages over conventional blocker doors made from different materials that are coupled together. For example, conventional blocker doors are fabricated from upper and lower skins that surround an aluminum honeycomb core coupled to the skins by an adhesive. The aluminum honeycomb core often includes standardized cell height and wall thickness. A portion of the honeycomb core may be filled in with a potting compound to enable the honeycomb core to sustain higher loads if the standardized sizes do not meet specifications. However, in addition to increasing the weight of the blocker door, the potting compound has an undesirable effect on the sound attenuation characteristics of the aluminum honeycomb core. The use of molded thermoplastic avoids the constraints of utilizing standard sized honeycomb and also avoids the use of the potting material filling of the honeycomb because the cell height and wall thickness can be customized to meet desired specification.

Furthermore, the removable individual core inserts enable different portions of the honeycomb body portion to have different cell sizes to account for different loading or noise attenuation requirements. Such customization of the honeycomb cell size allows for increased loading on body portion. Additionally, the use of thermoplastic materials to replace aluminum skin and honeycomb results in both a reduced weight of the blocker door and lower cost due to reduced material and labor costs.

Furthermore, each core insert is removably coupled to the ram plate such that each core insert is interchangeable to facilitate tailoring the size of honeycomb cells in the body portion to meet desired strength requirements. More specifically, smaller core insert may be coupled to the ram plate in an area where an increased strength is desired in the body portion. Because gaps between adjacent core insert define a wall thickness of honeycomb core cells, a smaller core insert leads to a larger wall thickness, which increases strength in that region of the body portion. Similarly, in areas where an increased strength is not required, a larger core insert can be used to decrease the wall thickness and, thus, decrease the weight of the body portion. As such, the wall thickness of each cell of the honeycomb core is able to be tailored based on the size of the core insert used for that cell, wherein the size of core insert is based on a desired load capacity at the location of the cell in the honeycomb core.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A compression molding assembly for molding a thermoplastic honeycomb core of a blocker door, wherein the thermoplastic honeycomb core comprises a plurality of cells defined by a plurality of walls, said compression molding assembly comprising:
   a lower mounting assembly that at least partially forms a cavity configured to receive a molding material; and
   an upper mounting assembly comprising:
      a ram plate comprising a plurality of openings defined therethrough; and
      a plurality of core inserts coupled to said ram plate and configured to form the thermoplastic honeycomb core of the blocker door, wherein each said core insert is removably coupled with a respective opening of said plurality of openings such that each core insert is configured to form a respective cell of the plurality of cells, wherein said ram plate is movable and configured to press said plurality of core inserts into the molding material.

2. The compression molding assembly according to claim 1, wherein said plurality of core inserts comprises a plurality of sets of core inserts, wherein each set of core inserts is a different size than every other set of core inserts.

3. The compression molding assembly according to claim 1, wherein said plurality of core inserts comprises a first set of core inserts and a second set of core inserts, wherein said first set of core inserts comprises a first size and said second set of core inserts comprises a second size different than the first size.

4. The compression molding assembly according to claim 1, wherein a gap is defined between adjacent core inserts of said plurality of core inserts, wherein the gap defines a thickness of a cell wall of the honeycomb core.

5. The compression molding assembly according to claim 1, further comprising a plurality of removable fasteners configured to couple a respective core insert of said plurality of core inserts into a respective opening of said plurality of openings.

6. The compression molding assembly according to claim 5, further comprising a plurality of indexing pins coupled to said core inserts and to said ram plate and configured to facilitate a proper orientation of said core inserts.

7. The compression molding assembly according to claim 5, further comprising a plurality of keys coupled to said core inserts and to said ram plate and configured to prevent rotation of said core inserts.

8. The compression molding assembly according to claim 1, further comprising an ejector assembly coupled to said ram plate and configured to eject the blocker door from said ram plate.

9. The compression molding assembly according to claim 8, wherein said ejector assembly comprises a plurality of ejector pins configured to extend through a plurality of pin openings defined in said ram plate.

10. The compression molding assembly according to claim 1, wherein said lower molding assembly comprises a forming plate and a plurality of removable sidewalls coupled to said forming plate.

11. The compression molding assembly claim 10, wherein each sidewalls of said plurality of sidewalls is interchangeable based on a desired property of the blocker door.

12. The compression molding assembly claim 10, further comprising a plurality of removable mounting structure inserts configured for insertion into a respective opening in said forming plate.

13. The compression molding assembly claim 12, wherein mounting structure insert is modular based on predetermined desired mounting structures of the blocker door.

14. A compression molding assembly for molding a thermoplastic honeycomb core of a blocker door, wherein the thermoplastic honeycomb core comprises a plurality of cells defined by a plurality of walls, said compression molding assembly comprising:
   a lower molding assembly comprising:
      a forming plate; and
      a plurality of removable sidewalls coupled to said forming plate, wherein said lower molding assembly at least partially forms a cavity configured to receive a molding material; and
   an upper molding assembly movable with respect to said lower molding assembly, said upper molding assembly comprising:
      a ram plate comprising a plurality of openings defined therethrough;
      a plurality of core inserts coupled to said ram plate and configured to form the thermoplastic honeycomb core of the blocker door, wherein each said core insert is removably coupled with a respective opening of said plurality of openings such that each core insert is configured to form a respective cell of the plurality of cells, wherein said ram plate is configured to press said plurality of core inserts into the molding material;
      a plurality of removable fasteners configured to couple a respective core insert of said plurality of core inserts into a respective opening of said plurality of openings; and
      a plurality of keys coupled to said core inserts and to said ram plate and configured to prevent rotation of said core inserts.

15. The compression molding assembly according to claim 1, wherein said ram plate comprises a plurality of heat transfer channels oriented substantially perpendicular to said plurality of openings.

16. A compression molding assembly for molding a thermoplastic honeycomb core of a blocker door, wherein the thermoplastic honeycomb core comprises a plurality of cells defined by a plurality of walls, said compression molding assembly comprising:
   a lower molding assembly comprising:
      a forming plate; and
      a plurality of removable sidewalls coupled to said forming plate, wherein said lower molding assembly at least partially forms a cavity configured to receive a molding material;
   an upper molding assembly movable with respect to said lower molding assembly, said upper molding assembly comprising:
      a ram plate comprising a plurality of openings defined therethrough;
      a plurality of core inserts coupled to said ram plate and configured to form the thermoplastic honeycomb core of the blocker door, wherein each said core insert is removably coupled with a respective opening of said plurality of openings such that each core insert is configured to form a respective cell of the plurality of cells, wherein said ram plate is configured to press said plurality of core inserts into the molding material;

a plurality of removable fasteners configured to couple a respective core insert of said plurality of core inserts into a respective opening of said plurality of openings; and a plurality of indexing pins coupled to said core inserts and to said ram plate and configured to facilitate a proper orientation of said core inserts.

\* \* \* \* \*